US009994274B2

(12) United States Patent
van Balveren et al.

(10) Patent No.: US 9,994,274 B2
(45) Date of Patent: Jun. 12, 2018

(54) FIXING SYSTEM

(71) Applicant: Invented Here B.V., Ulft (NL)

(72) Inventors: Marthijn Marinus Gerardus Henrikus van Balveren, Ulft (NL); Wouter de Boer, Ulft (NL); Sander Leon de Wit, Ulft (NL); Libbe Homme Adema, Ulft (NL)

(73) Assignee: Invented Here B.V., Ulft (NL)

( * ) Notice: Subject to any disclaimer, the term of this patent is extended or adjusted under 35 U.S.C. 154(b) by 130 days.

(21) Appl. No.: 14/789,258

(22) Filed: Jul. 1, 2015

(65) Prior Publication Data

US 2016/0001839 A1 Jan. 7, 2016

(30) Foreign Application Priority Data

Jul. 4, 2014 (DE) .................. 10 2014 009 987
Aug. 21, 2014 (DE) .................. 10 2014 012 421

(51) Int. Cl.
*B62J 9/00* (2006.01)
*B62J 11/00* (2006.01)
*B62J 7/06* (2006.01)

(52) U.S. Cl.
CPC .............. *B62J 11/00* (2013.01); *B62J 9/003* (2013.01); *B62J 7/06* (2013.01)

(58) Field of Classification Search
CPC .............. B62J 11/00; B62J 9/003; B62J 7/06
See application file for complete search history.

(56) References Cited

U.S. PATENT DOCUMENTS 4,697,725 A * 10/1987 Miree .................. B62J 6/00
224/420
4,798,318 A * 1/1989 Irwin .................. B62J 7/06
224/417

(Continued)

FOREIGN PATENT DOCUMENTS

DE 195 34 204 A1 9/1995
DE 297 12 624 U1 9/1997

(Continued)

OTHER PUBLICATIONS

German Search Report DE 10 2014 012 421.5, dated Aug. 5, 2015 (10 pages).

(Continued)

*Primary Examiner* — Corey Skurdal
(74) *Attorney, Agent, or Firm* — Kilpatrick Townsend & Stockton LLP

(57) ABSTRACT

Disclosed is a fixing system for fixing containers such as bags or baskets on a handlebar of a bicycle, comprising at least one, preferably at least two handlebar bands slidable over the handlebar in a sliding-on direction and at least partially embracing the handlebar in the slid-on position, and a carrying bracket, comprising a carrying-bracket-side coupling element for receiving the container, arranged on a cantilever section of the carrying bracket, the carrying bracket further comprising a receiving section, able to be brought into coupling engagement with the handlebar bands against the sliding-on direction and thus positionable on the handlebar by preferably fixedly clamping the handlebar, further comprising at least one securing means frictionally engageable in a rigid manner between the cantilever section and a component of the bicycle other than the handlebar, and preferably a handle stem, so that rotation of the cantilever section relative to the handlebar is prevented.

18 Claims, 19 Drawing Sheets

(56) References Cited

U.S. PATENT DOCUMENTS

| | | | |
|---|---|---|---|
| 5,024,359 A * | 6/1991 | Thomas | B62J 7/06 224/414 |
| 5,282,554 A * | 2/1994 | Thomas | B62J 7/06 224/421 |
| 5,406,816 A * | 4/1995 | Thomas | B62J 7/06 224/414 |
| 5,913,466 A * | 6/1999 | Revels | B62J 9/003 224/421 |
| 6,062,053 A * | 5/2000 | Ho | B62J 9/003 224/417 |
| 6,196,433 B1 * | 3/2001 | Lohr | B62J 7/00 224/420 |
| 6,328,190 B1 * | 12/2001 | Lohr | B62J 9/003 224/420 |
| 7,779,724 B2 * | 8/2010 | Fujii | B62M 25/08 192/217 |
| 7,922,136 B2 * | 4/2011 | Lien | B62J 9/003 224/420 |
| 2010/0122994 A1 * | 5/2010 | Chuang | B62J 9/003 224/420 |
| 2010/0133309 A1 * | 6/2010 | Lee | B62J 7/04 224/420 |
| 2011/0266321 A1 | 11/2011 | Hsueh | |

FOREIGN PATENT DOCUMENTS

| | | |
|---|---|---|
| DE | 201 14 386 U1 | 11/2001 |
| DE | 295 22 330 U1 | 12/2001 |
| DE | 203 00 747 U1 | 4/2003 |
| EP | 2 735 498 A1 | 5/2014 |
| TW | 201018611 A | 5/2010 |
| TW | 201233579 A1 | 8/2012 |
| TW | M4600391 U1 | 8/2013 |

OTHER PUBLICATIONS

European Search Report 15174538.7, dated Nov. 10, 2015 (10 pages).

* cited by examiner

FIXING SYSTEM

CROSS-REFERENCE TO RELATED APPLICATIONS

This application claims priority to German Patent Application No. 10 2014 012 421.5, filed Aug. 21, 2014, and also claims priority to German Patent Application No. 10 2014 009 987.3, filed Jul. 4, 2014, the disclosures of which are incorporated by reference herein.

The present invention relates to a fixing system for fixing containers, such as bags or baskets, on a handlebar of a bicycle.

Such fixing systems are known from the state of the art. They serve for fixing various objects, such as bags, baskets, goods-carrying trays, goods carriers or the like elements, referred to as containers in the following. A bicycle in the scope of the present invention is any cycle allowing the rolling mobility of a user, driven by manual or motorized means.

In the fixing systems known from the state of the art for fixing the above containers on the handlebar of a bicycle, it is problematic that the systems can only be adapted to the various handlebar diameters with great trouble. The shape of the handlebar, or the dimension of a handle stem mounted thereto, for mounting the handlebar on the bicycle itself, also leads to problems with respect to fixing the above containers.

Moreover, the ability of quick and easy mounting combined with versatile adaptability to various handlebar and bicycle systems is required with such fixing systems. This requirement is only insufficiently fulfilled by the systems known from the state of the art.

In addition, it is problematic with the systems known from the state of the art to ensure reliable and in particular rotation-resistant fixing on the handlebar, in particular, in the case of heavy containers or for driving on a rough road surface.

It is thus the object of the present invention to provide a fixing system for fixing containers on a handlebar of a bicycle ensuring ease of mounting combined with great flexibility, reliability in operation and adaptability.

The object is achieved by a fixing system according to claim 1.

In particular, the object is achieved by a fixing system for fixing containers such as bags or baskets, referred to as luggage in the following, on a handlebar of a bicycle, comprising at least one, preferably at least two handlebar bands slidable over the handlebar in a sliding-on direction and at least partially embracing the handlebar in the slid-on position, and a carrying bracket, comprising a carrying-bracket-side coupling element for receiving the container, which is arranged on a cantilever section of the carrying bracket, the carrying bracket further comprising a receiving section, preferably able to be brought into coupling engagement with the handlebar bands against the sliding-on direction and thus able to be positioned on the handlebar by preferably fixedly clamping the handlebar, further comprising at least one securing means frictionally engageable in an essentially rigid manner between the cantilever section and a component of the bicycle other than the handlebar, preferably the handle stem, so that rotation of the cantilever section relative to the handlebar is prevented.

According to the invention, the fixing system preferably comprises at least two handlebar bands which, together with the complementarily formed carrying bracket, allow fixing of the carrying bracket on the handlebar. The couplable configuration of the handlebar bands with the receiving section allows extremely simple mounting. In particular with modern bicycles having complex gear change mechanisms a great number of Bowden cables and cable systems are arranged in the area of the handlebar, for this reason with the configuration of a carrying bracket, which can be fixed on the bicycle handlebar by means of the at least one, preferably two, handlebar bands which can be slid over the handlebar, a system is provided which is extremely easily and simply mounted, while at the same time providing high operational safety. The receiving section can be integrally formed with the carrying bracket or can be provided as an independent element.

Depending on the configuration of the bands, sliding the handlebar bands over the handlebar allows pre-positioning of the bands so that the carrying bracket is mountable in an easy and uncomplicated manner. The bands are preferably formed to be freely positionable and preferably rotatable about the handlebar and/or shiftable thereon, preferably also in the slid-on state and in particular prior to final fixing on the carrying bracket. It is also possible to apply the bands only in a spatially limited section, and, in particular, only at points, on the handlebar. This is also referred to as sliding-on in the scope of the present invention, wherein the bands embrace the handlebar at least partially, in this case, over a very small section.

An anti-rotation securing means of the carrying bracket relative to the handlebar is preferably (additionally) provided by the securing means which is able to be brought into frictional engagement essentially rigidly between the cantilever section and a component of the bicycle other than the handlebar and preferably a handle stem. Preferably configured as a compression rod element or a torsion rod element, the securing means thus basically allows a dissipation of loads introduced into the fixing system by means of the coupling element. Rotation of the cantilever section relative to the handlebar, in particular, is thus prevented. The advantage of an essentially rigid configuration is the very simple frictional engagement between the cantilever section and a component of the bicycle other than the handlebar, or a handle stem. It is thus possible to simply apply, secure, support etc. the securing means on these components to dissipate forces from the cantilever section into the bicycle via the securing means. The securing means preferably also serves as a rotation-preventing means to prevent the cantilever section, together with the coupling element fixed thereto and the luggage, from rotating relative to the handlebar. While this can also be prevented by sufficient fixing and in particular prestressing the bands relative to the carrying bracket about the handlebar, this is more effectively and/or additionally achieved by supporting, frictionally coupling etc. the securing means on the component of the bicycle other than the handlebar, and preferably the handle stem.

Further embodiments according to the invention of the securing element will be discussed in more detail in the following.

The handlebar bands are preferably formed as independent components. Not only does this allow the provision of different handlebar bands having various dimensions so that ease of adaptability to various handlebars and in particular handlebar diameters or stems is ensured, but also ensures the ability to exchange any damaged handlebar bands, which increases the useful life of the fixing system according to the present invention.

It is also conceivable to form the handlebar bands integrally or in a manner couplable to the carrying bracket. The handlebar bands can thus also be formed or are arrangeable on the carrying bracket as hook or hook-like elements. The receiving section can also be formed integrally on the carrying bracket or as an independent component and, in particular, can also be fixable thereto. The receiving section can be a clamp element, for example, and, in particular, a tapering element, which is fixable on the carrying bracket or the bands by clamping the handlebar. It is also conceivable to form the handlebar bands in such a way that they can be arranged on the carrying bracket by means of connecting elements. Such connecting elements can be, for example, tongue and groove engagement elements or similar connecting means. It is thus possible to arrange various bands on the carrying bracket or vice versa, to adapt, for example, the fixing system to various handlebars or stems etc.

Preferably, the handlebar bands are of the same material as the carrying bracket. This allows optimization of the stresses acting on the fixing system and in addition the use of materials that prevent damage to the handlebar or other relevant delicate components on the bicycle. Since the individual components of the fixing system are preferably of a plastic material, this also ensures extremely low-cost manufacturability.

Preferably, the handlebar bands are formed as bands open on one side. In this way, they can be very easily slid over the handlebar. The bands are preferably configured as elastic bands, or as bands having at least a partially elastic section, allowing a band to be slid over the handlebar very easily and, in particular, preferably by means of an interference fit. Moreover, this allows a band to be used for various handlebars and, in particular, handlebar diameters.

It is also possible to manufacture the bands from a strap-like band or similar flexible material.

Preferably, the handlebar bands comprise at least two free, preferably elastic, end sections defining an introduction space into which the handlebar can be introduced and preferably passed during sliding-on. Such an embodiment is preferably applied when the handlebar bands are configured as open bands. The introduction space is preferably a free space into which the handlebar is insertable and thus introduceable and preferably snap-engageable into the introduction space formed by the band. The handlebar band is preferably adapted to the geometry and in particular the cross-section geometry of the handlebar and is preferably configured as its complement.

The handlebar bands preferably comprise mounting protrusions preferably at their free end sections. The carrying bracket, or the receiving section of the carrying bracket, preferably comprises mounting protrusion receivers preferably complementary to such mounting protrusions, into which the mounting protrusions are insertable, preferably parallel to the sliding-on direction. The mounting protrusions on the handlebar bands are thus formed in such a way that they are preferably slidably insertable into the mounting protrusion receivers on the carrying bracket. The mounting protrusion receivers are preferably formed in such a way that they allow slidability of the mounting protrusion along an axis and in this case preferably an axis parallel to the sliding-on direction. This guarantees fixing, or guiding, of the mounting protrusions within the mounting protrusion receivers in a direction deviating from this introduction direction. It is also possible, however, to configure the mounting protrusions, or the mounting protrusion receivers, in such a way that not only introduction of the mounting protrusions along the introduction direction and preferably along the sliding-on direction is possible, but also adaption in a direction deviating therefrom, for example, in order to reduce or increase the receiving space defined by the handlebar bands for the handlebar, that is to adapt the handlebar band to different handlebar diameters.

Preferably, the mounting protrusion receivers are configured as complements to the mounting protrusions and, in particular, so that the mounting protrusions are configured to be movable only along one axis within the mounting protrusion receiver. This allows the movement of the carrying bracket along this axis and thus clamping of the handlebar, which is arranged within the handlebar bands and the carrying bracket, in a very reliable manner.

Preferably, fixing means are provided by means of which the bands and, in particular, their mounting protrusions are fixable on the carrying bracket and, in particular, within its mounting protrusion receivers. These fixing means are preferably formed in such a way that the carrying bracket can be prestressed against the bands by means of the fixing means, preferably by fixedly clamping the handlebar. Such fixing means can be threaded means, for example, allowing prestressing of the mounting protrusions against the mounting protrusion receivers, or support elements formed thereon or therein. It is possible, for example, to provide threaded means on the mounting protrusions, within which corresponding screw means engage, which are fixed on the mounting protrusion receivers, or vice versa, and thus prestress, or fix, the carrying bracket against the handlebar bands.

Preferably, the fixing means are arranged in such a way that they generate a force between the carrying bracket and the bands, which is parallel to the sliding-on direction. The handlebar is thus reliably clamped between the bands and the carrying bracket, wherein moment stresses are avoided.

The fixing system is preferably configured in such a way that fixedly clamping the handlebar between the bands and the carrying bracket only occurs once the final positioning of the fixing means has been found. The carrying bracket can thus preferably be coupled with the bands in such a way that the combination consisting of the carrying bracket and the bands is still pivotable about the handlebar or positionable with respect thereto. Fixing of the carrying bracket, such as fixedly clamping the handlebar and preferably fixing it in such a manner that repositioning of the fixing system, or the carrying bracket, is no longer possible, is only carried out after final positioning. To achieve this, fixing means of the above-mentioned type are preferably used, which firmly fix the carrying bracket against the handlebar.

Preferably, the carrying bracket is formed as a U-shaped bracket or the like, comprising at least two arms. Preferably, the arms at least partially form the cantilever section. Moreover, it is advantageous for the mounting protrusion receivers to be formed in or on the arms and/or to be arrangeable thereon. The receiving section is preferably formed or arrangeable remote from the cantilever section so that the cantilever section extends remotely from the receiving section.

To form the receiving section, preferably a section of the carrying bracket or an element arrangeable thereon is formed as a complement to a section of the handlebar. It is possible, for example, to provide receiving recesses or corresponding receiving supports, tapering surface elements, clamping elements etc. formed in a fashion complementary to the handlebar. It is also possible to form corresponding intermediate elements on the receiving section allowing the carrying bracket to be supported on the handlebar in a manner which is secure and adapted in its position, support points, geometry, visual appearance, handlebar receivers etc. Such intermediate elements can optionally be arranged, for example, as spacers between the receiving section and the carrying bracket. The receiving section preferably comprises guiding elements facilitating and/or causing positioning and/or pre-positioning of the handlebar prior to fixing by means of the fixing means and/or fixing by means of the bands.

Preferably, the mounting protrusion receivers are provided as optionally arrangeable mounting protrusion receivers, which are attachable on the carrying bracket by means of receiving means at least at one alternative position, and are able to be brought into coupling engagement with the bands against the sliding-on direction. It is also conceivable to form the mounting protrusion receivers in such a way that they are positionable as needed on the carrying bracket by means of receiving means, such as screws, detent means, plug means, adhesive connections etc., and which then allow fixing of the carrying bracket. This allows simple adaptability of the fixing system to various handle stems or similar bicycle geometries. It is conceivable to integrally form mounting protrusion receivers on the carrying bracket itself and to provide further optional mounting protrusion receivers that can be arranged on the carrying bracket as needed and allow fixing of the carrying bracket on the handlebar.

Preferably, the optionally arrangeable mounting protrusion receivers are formed in such a way that they are attachable and preferably insertable on the carrying bracket in a direction which deviates from the above-mentioned sliding-on direction and is preferably orthogonal thereto.

The optionally arrangeable mounting protrusion receivers are preferably formed of the same material as the carrying bracket and preferably of a plastic material.

Preferably, the coupling element is arranged or arrangeable on the arms of the carrying element, preferably on end sections of the arms, and preferably spaced from the mounting protrusion receivers, or the receiving section. Preferably, a fixing system is formed which is supported on the handlebar in the manner of a rocker, wherein the area comprising the receiving section and the bands form the "rocker support" and the cantilever section forms a rocker leg. The latter carries the coupling element by which a container is attachable on the fixing system.

A coupling element in the present context is any element which allows a container to be attached. In this case, quick coupling systems, such as rail systems, as well as threaded coupling, detent coupling or similar coupling systems are conceivable.

Preferably, the coupling element comprises a support body, which is formed to be preferably clampably fixable between the two arms of the carrying bracket and which thus preferably allows fixing of the coupling element in different positions and/or in different orientations and thus selective alignment of a container attached thereto. Preferably, the support body is formed to be rotatable in particular about an axis extending between the two arms of the carrying element, so that angular adjustment of the coupling element, or a container attached thereto, is possible relative to the axis of rotation.

Preferably, the support body comprises at least two end faces facing away from each other formed to be complementary and preferably parallel to corresponding support surfaces on the arms of the carrying bracket, and at least one fixing means, by means of which the end faces are pressable against the support surfaces of the support body, thus fixing it. Such a fixing means can be a bolt means, for example, which urges each of the arms of the carrying bracket against the support body so that the end faces are pressed against the support surfaces. Such a press fit allows fixing of the support body relative to the carrying bracket.

The coupling element and preferably the end faces of a support body preferably comprise a detent means, which is or can be brought into releasable frictional engagement with a counter detent means on the carrying bracket and preferably on the arms of the carrying bracket and particularly preferably on its support surfaces, or vice versa, and allows fixing of the coupling element in different positions and/or in different orientations. Such detent means or counter detent means can be, for example, detent toothing, preferably of the type which is formed to be complementary on the end faces and support surfaces. Any and all detent means and counter detent means known from the state of the art are applicable here.

As mentioned above, the carrying bracket preferably comprises at least one securing means by means of which it is fixable against a component of the bicycle other than the handlebar and preferably against a handle stem. Preferably, the securing means is formed as a bending rod and/or compression rod element, and in particular as an essentially rigid bracket element. It is preferably supported against the component of the bicycle other than the handlebar, such as the handle stem, and, particularly preferably, when the fixing system is loaded with luggage.

Preferably, the securing means against the component other than the handlebar is able to be brought into frictional engagement in such a way that rotation of the cantilever section relative to the handlebar is prevented at least in one direction of rotation and preferably in two opposite rotation directions. This one rotation direction is preferably the direction in which the cantilever section is urged by the luggage due to gravity. It is also additionally possible to arrange the securing means in such a way that securing occurs in at least one (further) rotation direction, for example a direction opposite to the above, for example when the bicycle rolls over a hump and the luggage is propelled upwards as a consequence.

The securing means can be formed as an independent component or integrally with the carrying bracket. Integral extension of the carrying bracket is thus conceivable to form the securing means.

In particular when formed as an independent component, the securing means preferably comprises at least one locking means, by means of which it is arranged on the carrying bracket, in particular in a fixedly pivotable manner. It is conceivable to provide the securing means as a pivoting arm or corresponding bracket that is linked or fixed to the fixing system. It is thus possible to adapt the system to various bicycles.

As mentioned above, articulated linking of the securing means to the carrying bracket is preferably configured in a lockable manner. Lockable pivoting hinges, detent connections etc. could be used, for example. The advantage of such an embodiment is that locking of the securing means on the carrying bracket rigid and thus the frictional engagement is improved.

To increase adaptability, the securing means is preferably arrangeable and/or fixable at least partially at different positions on the carrying bracket and/or in different orientations and/or relative to the carrying bracket. In such an embodiment, the securing means is preferably arranged, or formed, in the connection area of the free arms. It preferably comprises a section which is partially rotatable, so that it allows arrangement at different positions and/or orientations, in particular pivoting directions. In this way, optimum support against the part remote from the handlebar can be ensured and/or a fixing means for fixing the securing means can be optimally positioned on this remote part.

Preferably, in the above pivotable or adaptable arrangements of the securing means, that is the carrying bracket, the securing means is fixable by means of at least one fixing means on the component of the bicycle other than the handlebar and preferably on the handle stem. The securing means preferably comprises this fixing means. Such a fixing means can be an elastic fixing means, for example, such as a hook and loop connection or a similar flexible strap connection. It is also possible to configure the securing means as a further band, similar to the handlebar bands. The securing means can also be formed as a contacting element, which dissipates or applies loads preferably along an axis.

Preferably, the securing means is arranged remote from the receiving section and from the coupling element. It is preferred, in particular, to form the carrying bracket and the securing means arranged thereon, the handlebar and the bands in such a way, that the handlebar bands form a pivot point for the carrying bracket, wherein the securing means and the coupling element are arranged on different sides from the pivot point. In other words, the mounting protrusion receivers are preferably arranged along the carrying bracket between the securing means and that cantilever section. By these means, loads applied to the carrying bracket by means of the coupling element are securely dissipated to the bicycle by the bands and the securing means. The securing means is preferably an optional securing means which is used as needed and in particular when very heavy loads, in particular a very large or heavy container, is used. It is thus preferably optionally arrangeable on the carrying bracket. Any and all fixing means known from the state of the art are applicable to such securing means.

As mentioned above, the securing means is preferably arranged in the connection area of the free arms, or forms it. In particular, such a connection area is the area in which the free arms in the configuration of the carrying bracket come together as a U-bracket in the "U-bend area."

It is also possible to form the securing means in such a way that it is arranged and in particular fixed with one section to each arm. To achieve this, the securing means is preferably formed as a securing bracket, which is fixed or fixable with one arm to each arm of the carrying bracket.

Preferably the carrying bracket is formed to be pressed against the underside of the handlebar in such a way that it abuts the handle stem of the bicycle or an adjacent area with at least one part of the securing means. This allows loads to be securely applied to the bicycle from the cantilever area. Preferably, the handlebar bands serve as pivot points for such moment-caused force application.

In this connection, in particular, the handlebar bands are preferably formed in such a way that, in the sliding-on direction $R_U$, they extend in the vertical direction (in the direction of gravity). The carrying bracket is thus suspended from the handlebar by means of the handlebar bands.

Further embodiments of the invention can be derived from the dependent claims.

The invention will be described in the following with respect to one exemplary embodiment which will be explained in detail with reference to the accompanying drawings, in which.

For the same and similar components, the same reference numerals will be used throughout the following, wherein superscripts may sometimes be used.

Figure 1:
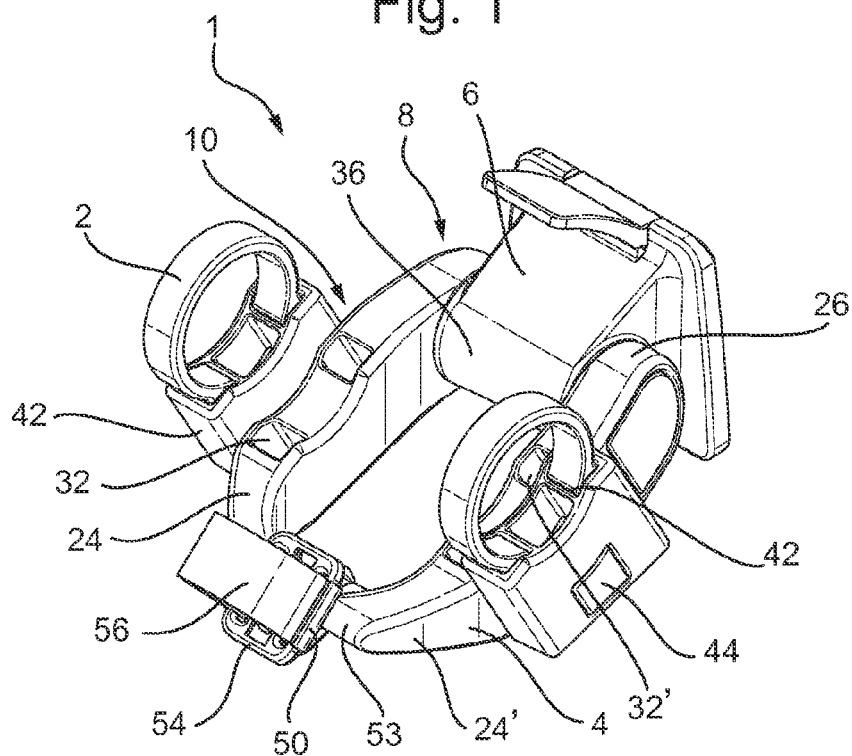
FIGS. 1 and 2 are isometric views diagonally from below of an embodiment of the fixing system according to the present invention.
Figure 2:
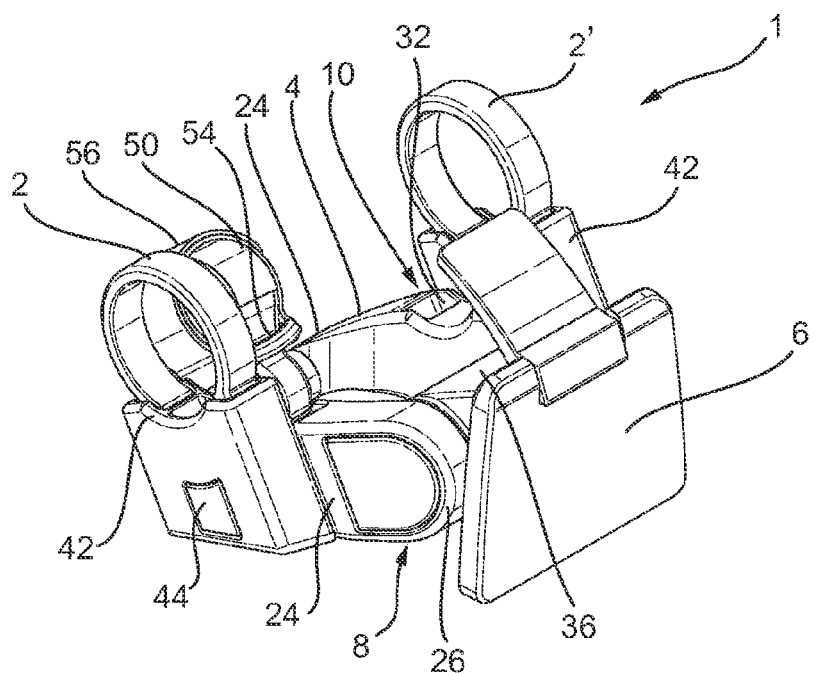
Figure 3:
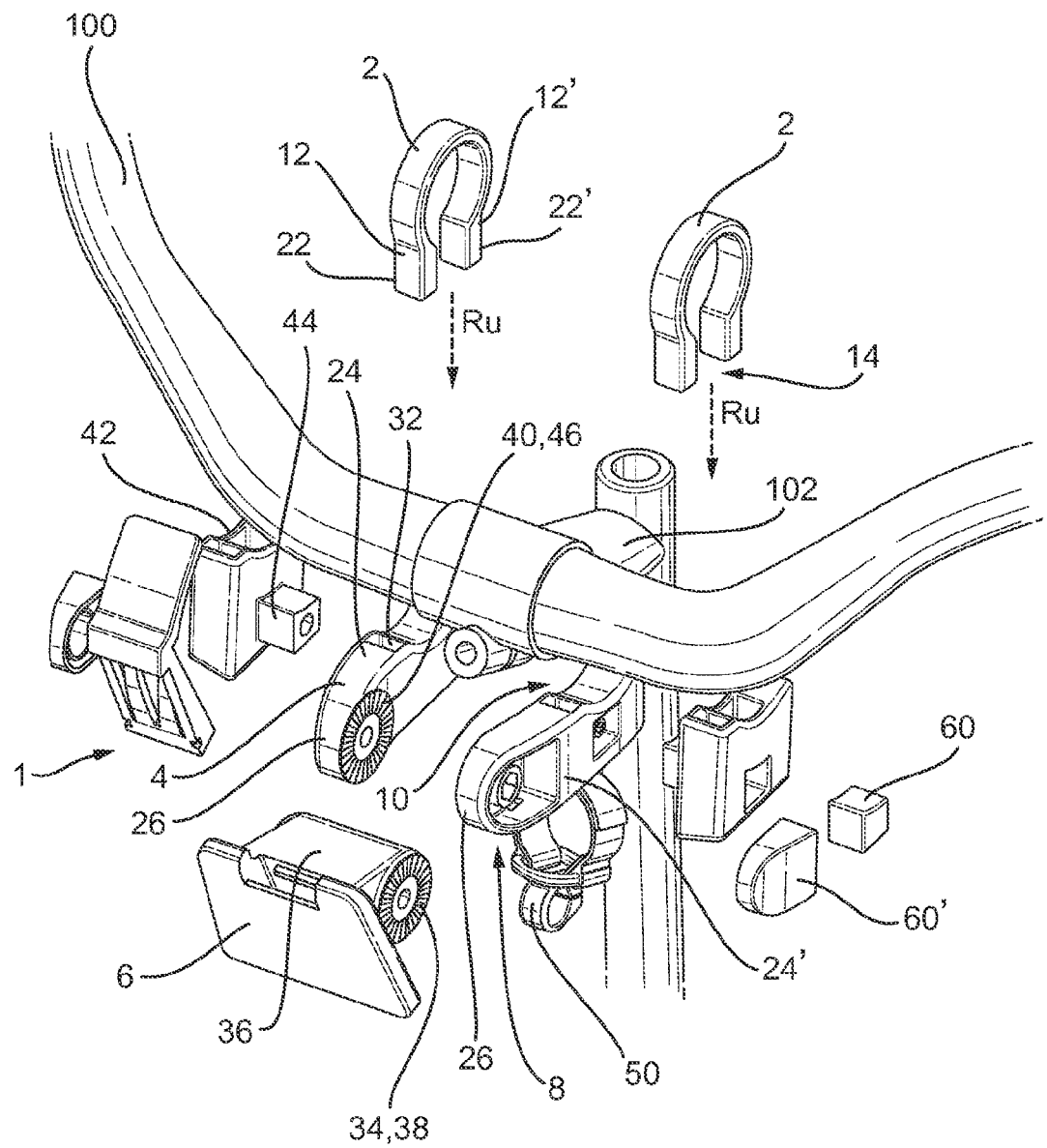
FIGS. 3, 4 and 5 are isometric exploded views of the embodiment according to FIG. 1.
Figure 4:
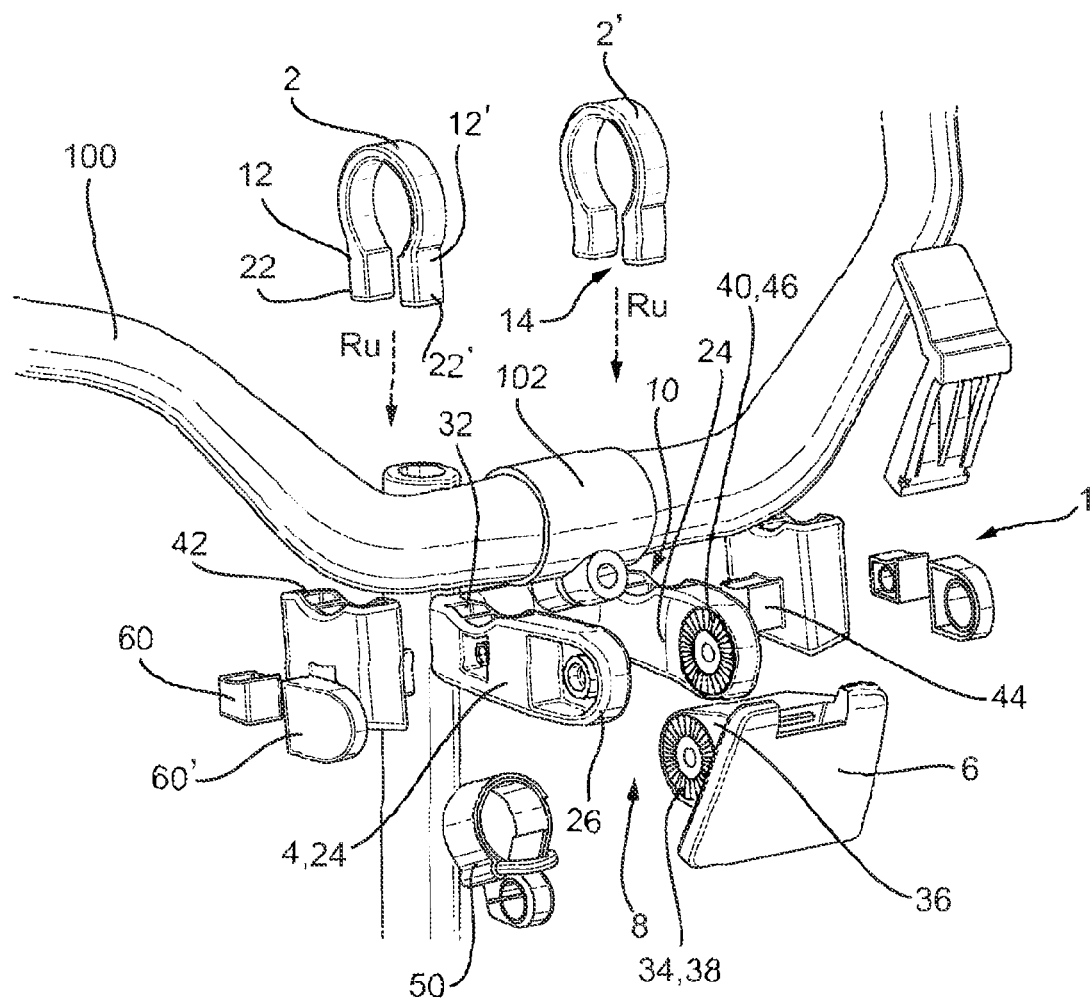
Figure 5:
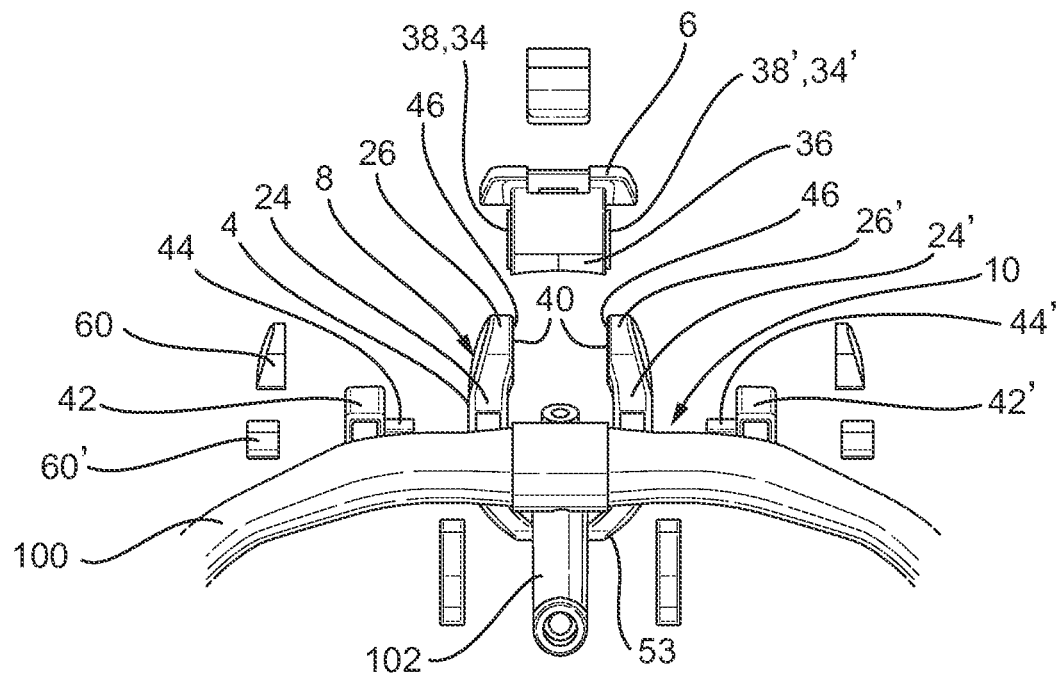
Figure 6:
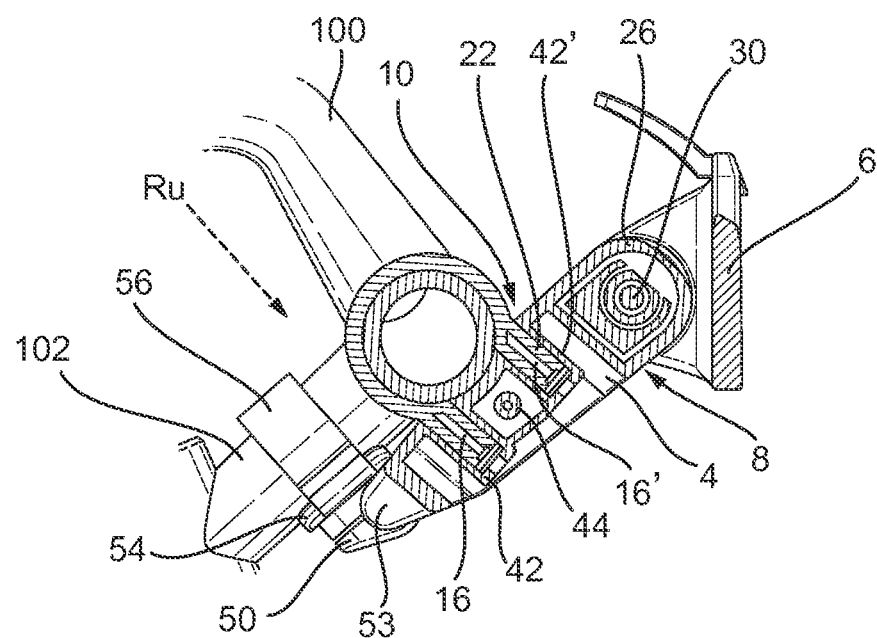
FIG. 6 is a cross-sectional view of the embodiment according to FIG. 1 in a mounted state on a handlebar.

FIGS. 1 and 2 are isometric views diagonally from below of an embodiment of the fixing system according to the present invention for fixing containers such as bags or baskets to a handlebar of a bicycle. The handlebar 100 is shown in FIGS. 3 to 6. This embodiment according to FIGS. 1 and 2 is shown in FIGS. 3, 4 and 5 as an exploded view (FIGS. 3 and 4 diagonally from the front and FIG. 5 from above). FIG. 6 shows the embodiment according to the preceding figures in a cross-sectional view, in a mounted state on the handlebar 100.

It should be noted that the individual embodiments and specifications of the fixing system according to the invention described in the following, in particular as defined in the claims, can be used alone but also in combination with each other and are not limited to the embodiment shown here and described in each respective context.

The embodiment shown in FIGS. 1 to 6 of the fixing system 1 according to the present invention comprises two handlebar bands 2, which are slidable over the handlebar 100 of a bicycle in a sliding-on direction $R_U$ (see FIGS. 3, 4 and 6) and at least partially embrace the handlebar 100 in the slid-on position. Furthermore, a carrying bracket 4 is provided, comprising a carrying-bracket-side coupling element 6 for receiving a container as initially defined, arranged at a cantilever section 8 of the carrying bracket 4.

The carrying bracket 4 comprises a receiving section 10 able to be brought into coupling engagement with the bands 2 against the sliding-on direction $R_U$ and thus preferably positionable in a fixed relationship on the handlebar by clamping the handlebar 100. The receiving section is integrally formed with the carrying bracket. As shown, in particular, in FIGS. 3, 4 and 6, the carrying bracket 4, or the receiving section, can be brought into coupling engagement with the bands 2 against the sliding-on direction $R_U$ shown, and thus fixed on the handlebar 100.

In the present embodiment, the bands 2 are optionally formed to be independent components. It is thus possible to provide different bands for different handlebar diameters, but also handlebar designs, and also for different points depending on the requirements on the fixing system (large loads, small loads etc.).

The same also applies to the carrying bracket 4, which can be provided in various ways, wherein preferably identical clamps can always be brought into coupling engagement with the same. Sets of fixing systems can thus be provided having different bands and/or different carrying brackets.

Optionally, the handlebar bands 2 are formed as bands open on one side. Preferably they have free and in particular elastic end sections 12 defining an introduction space 14, into which the handlebar 100 is able to be introduced, and preferably passed through, during sliding-on. It is possible to configure the entire bands 2, but also portions thereof, as an elastic component.

Optionally, the handlebar bands 2 comprise mounting protrusions 22 preferably on their free end sections 12. These mounting protrusions 22 are complementary to mounting protrusion receivers 32, 42 formed or able to be formed in the area of the receiving section 10. The mounting protrusions 22 are formed in such a way that they can be introduced into the mounting protrusion receivers 32, 42, and introduced parallel to the sliding-on direction $R_U$. The sliding-on direction is preferably defined by an axis describing the shortest connection between the slid-on bands and the carrying bracket (see, in particular, FIG. 6). It is also possible to slide the bands 2 onto the handlebar 100 in a different direction and then to rotate it in the specified manner so that they are oriented in the sliding-on direction. In this way, the sliding-on direction also corresponds to an introduction direction in which the mounting protrusions 22 are introduced into the mounting protrusion receivers 32, 42.

As shown, in particular, in FIG. 6, fixing means 16 are preferably provided, by means of which the bands 2 and, in particular, their mounting protrusions 22 are fixable on the carrying bracket 4 and, in particular, in its mounting protrusion receivers 32, 42. These fixing means 22 are formed as threaded means able to be screwed into the mounting protrusions 22, or the internal threads formed therein, on the side of the mounting protrusion receivers 32, 42 on the carrying bracket 4. Any and all fixing means known from the state of the art are applicable here.

Optionally, the fixing means 16 is formed in such a way that the carrying bracket 4 is able to be prestressed against the bands 2, preferably by clamping the handlebar 100, by means of the fixing means 16. In other words, the fixing means are preferably formed in such a way that the carrying bracket 4 is at least partially movable towards and away from the bands 2. In these embodiments, for example, the fixing means can be adjusted in such a way that there is a loose connection between the bands 2 and the carrying bracket 4 so that rotation of the fixing system is possible about the handlebar 100. After precise orientation of the fixing system, final fixing of the fixing means is carried out and thus the fixing system is clamped on the handlebar 100. Furthermore, for the dissipation of particularly heavy or extreme loads, the securing means 50 can be used, as will be described in more detail in the following.

Optionally, the carrying bracket 4 is formed as a U-shaped or similar bracket having at least two arms 24. The arms 24 at least partially form the cantilever section 8. In addition, the mounting protrusion receivers 32, 42 are formed and/or are arrangeable in or on the arms 24.

In detail, mounting protrusion receivers 32 integrally formed with the carrying bracket are provided here, into which the bands 22 can be introduced and fixed as needed. Moreover, optionally arrangeable mounting protrusion receivers 42 are provided, which are fixable on the carrying bracket 4 by means of receiving means 44 at least at one alternative position, and able to be brought into coupling engagement also with the bands 2 as needed. In this case, identical bands are applicable, but also other bands if necessary. The optionally arrangeable mounting protrusion receivers 42 are connected with the carrying element 4 via receiving means 44, formed here as introduction detents. It should be noted that it is not absolutely necessary for the carrying element 4 to comprise arms 24. Other embodiments of the carrying element can also be provided with the optionally arrangeable mounting protrusion receivers 42. Preferably, the receiving means 44 are formed in such a way that they allow fixing of the optionally arrangeable mounting protrusion receivers 42 in a direction deviating from the sliding-on direction $R_U$. Reliable force application from the bands to the carrying bracket, and hence to the handlebar 102, is thus ensured.

It is conceivable that a width adjustment of the fixing system is possible by means of the optionally arrangeable mounting protrusion receivers 42. It is thus possible, for example, to arrange the fixing system also on broader stems 102. It is also possible to provide a free mounting space between the bands 2, allowing, for example, mounting of corresponding electronic devices and, in particular, tachographs, speedometers, etc.

Figure 7:
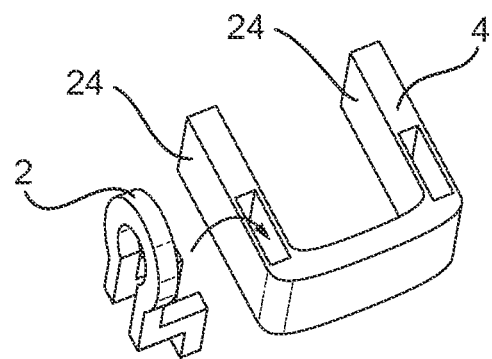
FIGS. 7 and 8 are isometric detail views of different handlebar bands of the embodiment of FIG. 1.
Figure 8:
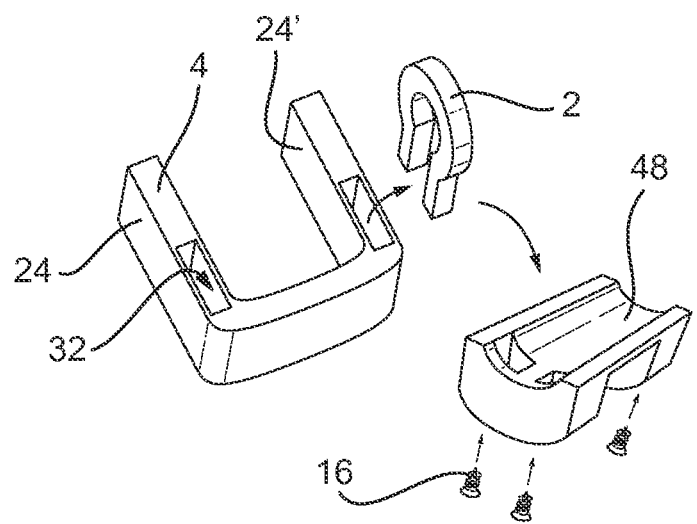
Figure 9:
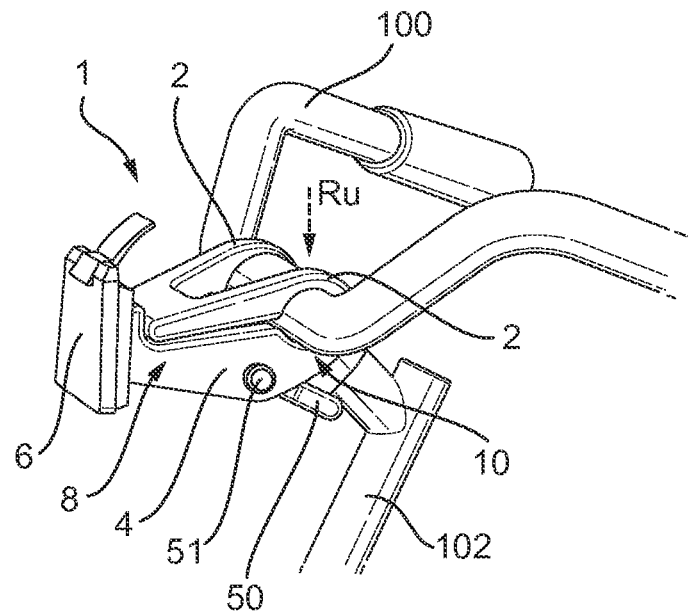
FIGS. 9 to 12 show different views of a further embodiment of the fixing system according to the present invention.
Figure 10:
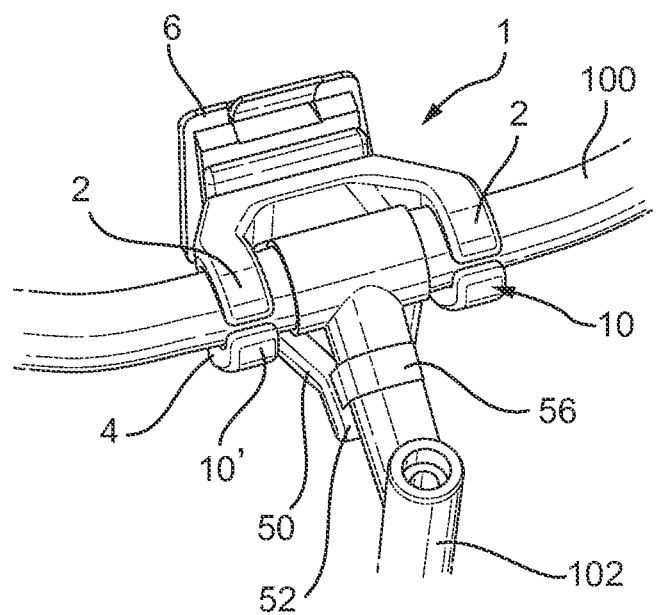

The above adjustment is also possible, however, by adapting the handlebar bands 2 used, as shown in FIGS. 7 and 8 in an exemplary manner. In direct comparison, for example with FIG. 5, it can be seen that the handlebar band shown in FIG. 7 enables wider support distance of the partially shown carrying bracket 4 on the handlebar 100 (see FIG. 5). Especially adapted handlebar bands 2 can also be used as needed to provide adaption to different stems 102, handlebars 100 and further conditions, such as for providing mounting space between the two arms 24 of the carrying bracket 4.

As shown in FIG. 8, it is also possible to provide respective adapter elements 48 which can be fixed to the carrying bracket 4 and, in the present case, in the mounting protrusion receivers 32 of the carrying bracket 4, instead of the bands 2. Again, suitable fixing means 16 are also optionally provided. The adapter elements also enable the support of the carrying bracket 4 on the handlebar 100 to be adapted, such as spaced support, adaption to special handlebar geometries, etc.

As shown in FIGS. 1 and 2, in particular, the optionally arrangeable mounting protrusions are also optionally formed in such a way that they allow the receiving section 10 on the carrying bracket 4 to be specified. With the optionally arrangeable mounting protrusion receivers 42 it is not only possible to change fixing of the bands but also to adapt the arrangement of the fixing system, in the present case to arrange it higher up on the handlebar. In other words, the optionally arrangeable mounting protrusion receivers 42 also provide optionally arrangeable support receivers enabling the arrangement of the fixing system to be adapted.

Optionally, the receiving section 10 is at least partially adapted to the handlebar geometry, or the geometry of the component on which the fixing system is fixedly clamped.

The variously dimensionable bands 2 and the optionally arrangeable mounting protrusion receivers 42 thus provide a fixing system adaptable to different handlebar dimensions and embodiments with almost infinite variability.

Preferably, the above-mentioned coupling element 6 is arranged for fixing the initially defined container on the arms 24 of the carrying element. Optionally, in the present embodiment, the coupling element 6 is arranged or arrangeable on end sections 26 of the arms and preferably spaced from the mounting protrusion receivers 32, 42.

As shown in FIG. 6, in particular, a rocker structure is formed in such an embodiment, wherein the area of the bands or the receiving section 10 forms the support point of such a rocker. According to the present invention, the carrying bracket 4 is formed to be pressable against the underside of the handlebar 100 in such a way that it abuts against the underside of the handle stem 102 of the bicycle with at least a portion of the carrying bracket 4 and, in the present case, with the securing means 50 provided thereon. Forces applied to the fixing system via the coupling element 6 and a container arranged thereon are thus dissipated into the bicycle via the bands and the carrying bracket 4 abutting on the handle stem 102 (in the present case, in the area of the securing means 50 which does not, however, have to be provided in a fixable form, a simple abutment area on the carrying bracket that abuts on the handle stem 102 is sufficient).

Optionally, the coupling element 6 comprises a support body 36 formed to be fixable between the arms 24 of the carrying bracket 4. Such a support body 36 can also be used with the carrying bracket, however, having a different embodiment than the one with two arms 24. Preferably, the support body is formed to be clampably fixable between the arms, or on the carrying bracket, so that secure fixing becomes possible. The support body is preferably formed in such a way that it allows fixing of the coupling element 6 in different positions and/or in different orientations. A container positioned on the coupling element 6 can thus be aligned relative to the bicycle.

Optionally, the support body 36 comprises at least two end faces 38 facing away from each other, which are formed to be complementary and preferably parallel to corresponding support surfaces 40 on the carrying bracket 4. Preferably, these support surfaces are formed on the arms 24 of the carrying bracket 4. Moreover, at least one fixing means 30 (see FIG. 6), such as a screw or a similar bolt, is provided, by means of which the end faces 38 are able to be pressed against the support surfaces 40, thus fixing the support body. Such a fixing means 30 can be a bolt, for example, passing through both the carrying element 4 or its arms 24, and the support body 36 of the coupling element 6, and having fixing means and, in particular, threaded means on both ends. However, it is also possible to provide the support body 30 with corresponding receiving means so that fixing means in the form of threaded means etc. can be introduced from both sides and fixed on the support body, so that the support body 36 can be fixed on the carrying means 4.

Optionally the coupling element 6 and preferably the end faces 38 comprise a detent means 34 in, or able to be brought into, releasable frictional engagement with a counter detent means 46 on the carrying bracket 4 and preferably on its arms 24 and, in particular, on support surfaces 40, and allowing fixing of the coupling element 6 in different positions and/or in different orientations.

As already mentioned the carrying bracket 4 comprises at least one securing means 50 by means of which it can be fixed against the component of the bicycle other than the handlebar 100 and preferably against a handle stem 102. Such securing means can comprise a simple contacting means so that the carrying bracket 4 abuts the corresponding component of the bicycle, and in particular the handle stem 102, via the securing means in an axial direction, it can, however, also be a multi-axial securing means such as shown, for example, in the enclosed figures (see in particular FIG. 6). The securing means 50 is formed as an integral component of the carrying bracket and extends as a bending rod element in the direction of the handle stem 102. In the present case, it comprises both a contacting surface 54 and a fixing means 56, such as a securing band or similar sling means 56, so that multi-axial fixing of the carrying bracket is possible on the handle stem 102 or on a corresponding component on the bicycle.

In detail, the securing means 50 is preferably configured in such a way that it is able to be frictionally coupled essentially rigidly between the cantilever section 8 and a component of the bicycle other than the handlebar 100, and, for example, the handle stem 102. This prevents rotation of the cantilever section 8 relative to the handlebar 100. The securing means is preferably at least partially formed as a bending rod and/or a compression rod element and, in particular, as an essentially rigid bracket element.

In an embodiment without the above-mentioned fixing means 56, the securing means is frictionally coupled against the component other than the handlebar 100 in such a way that rotation of the cantilever section 8 relative to the handlebar 100 is prevented at least in one rotation direction (in the clockwise direction about the handlebar 100 in FIG. 6). Such rotation is caused, for example, by a piece of luggage fixed to a coupling means. Further frictional engagement is achieved by means of the fixing means 56, wherein rotation of the cantilever portion 8 is prevented in opposite rotation directions. This is caused, for example, by rocking of the luggage on a rough road surface. Such fixing means 56 is preferably formed in such a way that the securing means 50 is fixable on the component of the bicycle other than the handlebar 100 and preferably on the handle stem 102.

The fixing means 56 is configured in such a way that it, and thus "a section of the securing means," is arrangeable and/or fixable at different positions on the carrying bracket 4 and/or in different orientations and/or relative to the carrying bracket. This allows the fixing system to be adapted to different bicycles.

As mentioned above, in the present embodiment the fixing system is configured in such a way that the receiving section 10 and preferably the mounting protrusion receivers 32, 42 are arranged between the securing means 50 and the cantilever section 80 along the carrying bracket 4. The resulting rocker system guarantees reliable force dissipation from the coupling element 6 into the bicycle or, in the present case, the handle stem 102.

Optionally the securing means 50 is arranged in the connection area 53 of the free arms 24. In particular in the present context, it is possible to form the securing means 50 at least partially, in the present case the fixing means 56, in such a way that it is arrangeable at different positions and/or in different orientations on the carrying bracket 4. This is implemented, for example, by ensuring pivotability of the fixing means 56 of the securing means 50 about the connection area 53.

It is also possible to form at least a portion of the securing means to be displaceable along this connection area thus enabling the eccentric mounting of the system with respect to the handle stem 102 and at the same time fixing with the securing means. A preferably lockable pivotable arrangement or configuration of the securing means or at least a portion thereof is also conceivable, as will be explained in detail in the following.

To protect each fixing means and attachment means of the fixing system against soiling and to camouflage it visually, suitable covering elements 60 are provided, which are slidable over each fixing or attachment means, or formed such that they are able to be sunk and/or clamped into corresponding receivers 62.

The explanations, details, descriptions and special features mentioned and described with respect to the above embodiment may also be applied to the further embodiments discussed in the following, unless otherwise explicitly stated. The above therefore also applies to the following.

FIGS. 9 to 12 show a further embodiment of the fixing system 1 according to the present invention. Again, two handlebar bands 2 are provided formed in the shape of a bracket element and configured to be slidable over the handlebar 100 in a sliding-on direction $R_U$. In this slid-on state, they at least partially embrace the handlebar 100. The handlebar bands 2 are coupled against a receiving section 10 via a fixing means 16, the receiving section 10 being integrally formed with the carrying bracket 4. The receiving section 10 is at least partially adapted in its geometry to the handlebar geometry. The carrying bracket 4 also comprises a cantilever section 8 to which a coupling element 6 is joined for receiving a bag or a basket or a similar piece of luggage.

In the present embodiment, the fixing means 16 is optionally formed as a threaded means, which additionally acts in such a way that clamping of the handlebar 100 is possible between the handlebar bands 2 and the receiving section 10, or the carrying bracket 4.

To provide further positional securing, in particular when the luggage has been mounted on the coupling element 6, a securing means 50 is provided as a bracket element, which is essentially rigidly frictionally coupled between the cantilever section 8 and a component of the bicycle other than the handlebar 100, and in particular a bicycle handle stem 102. In this way, rotation of the cantilever section 8 is prevented relative to the handlebar 100.

In the present embodiment, the securing means 50 is linked to the carrying bracket in a pivoting fashion thus accommodating various handle stems 102, but also enabling the angle between the cantilever section 8 and the handlebar to be adapted. The orientation of the coupling element and thus a piece of luggage mounted thereon can be adjusted in this way. While a first end 51 of the securing means 50 is linked to the carrying bracket 4 in an articulated fashion, a second end 52, or a section preferably at the end area of the securing means 50 comprises a fixing means 56, which is formed as a sling means in the present embodiment. It allows fixing of the securing means 50 on the handle stem 102, or on a component remote from the handlebar 100. It is thus possible to ensure a frictional engagement in the present embodiment between the carrying bracket 4 or the cantilever section 8 and a component other than the handlebar 100, so that rotation is prevented in at least two opposite rotation directions.

Figure 11:
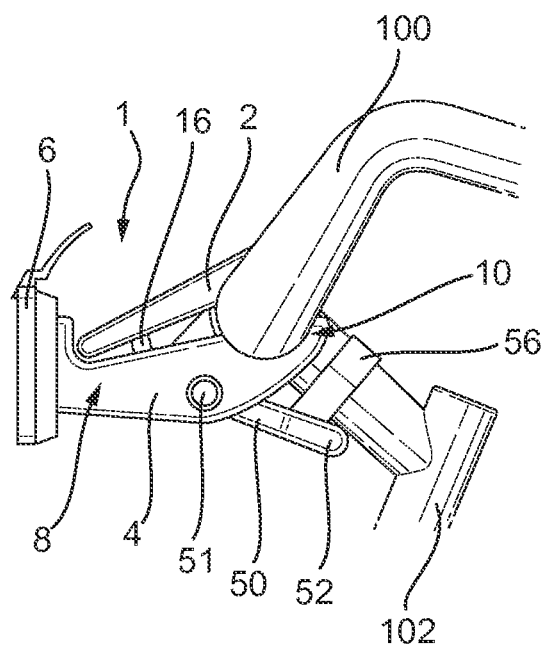
Figure 12:
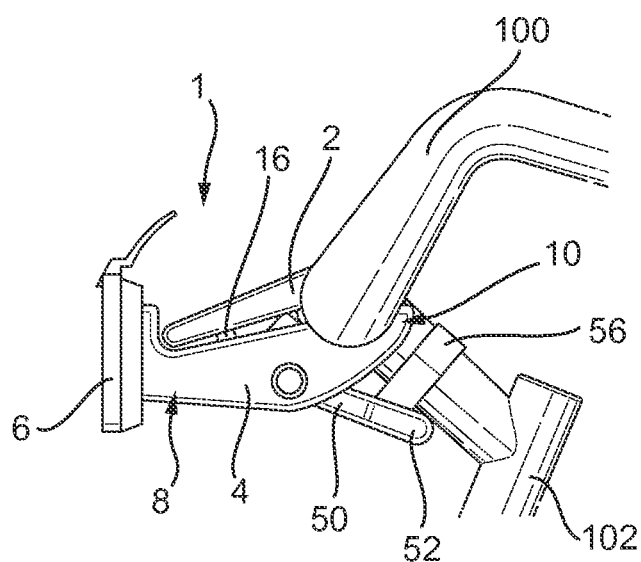
Figure 13:
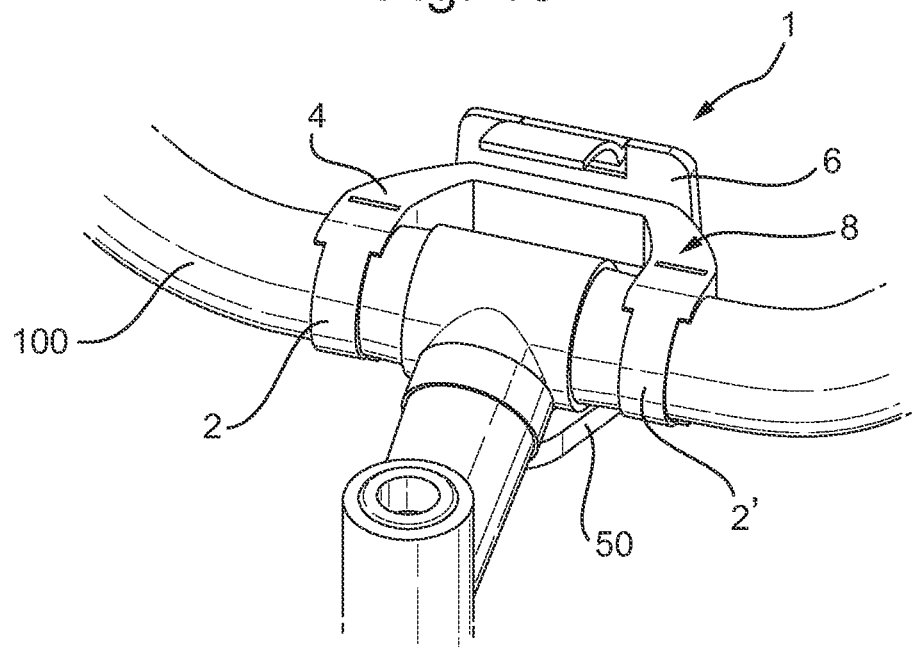
FIGS. 13 to 19 show different views of a further embodiment of the fixing system according to the present invention.

As shown in FIGS. 11 and 12, due to the frictional engagement between the handlebar bands and the carrying bracket 4 or the receiving section 10, adaptation to various handlebars 100 is very easily possible. Thus both a handlebar with a large handlebar diameter (see FIG. 11) and a handlebar with a smaller handlebar diameter (see FIG. 12) can be equipped with the fixing system according to the present invention. To enable such ease of adaptability preferably at least a portion of the handlebar band 2 or a portion of the receiving section 10 is formed to be elastic. It is also possible to provide corresponding adapted handlebar bands and/or receiving section elements, which can be used with the fixing system as needed. This special feature will be discussed in detail in the following.

FIGS. 13 to 19 show a further embodiment of the fixing system 1 according to the present invention. Again, two handlebar bands 2 are provided which are formed to be slidable over the handlebar 100. In the present embodiment, the handlebar bands are optionally formed to be elastic or flexible. For example, they can be a strap or of a similar material, but also a metal strip, steel strip etc. The handlebar bands 2 can be brought into frictional engagement with the receiving section 10 of a carrying bracket 4, so that the fixing system can be securely clamped on the handlebar 100.

In the present embodiment, again, the securing means 50 is also provided in the form of a rigid bracket element, which is arranged to be pivotable on the carrying bracket 4 and in particular on a cantilever section 8. For this purpose, the securing means 50 hingingly engages the carrying bracket 4 with a first end 51. A second end 52, or a second section, preferably in the end section of the securing means 50, can be optionally fixed on the handle stem 102 or on a different component of the bicycle via a fixing means 56 and, in the present case for example, via a sling element. By these means, again, frictional engagement is created between the carrying bracket 4 or a corresponding cantilever section 8 on which a coupling element 6 is fixed, and the handle stem 102, to thus prevent rotation of the cantilever section 8.

Figure 17:
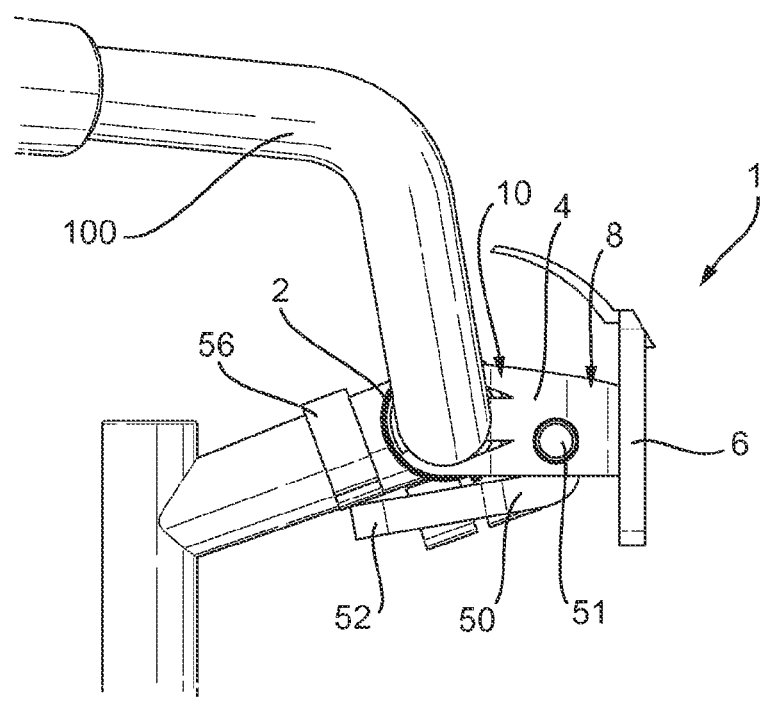
Figure 18:
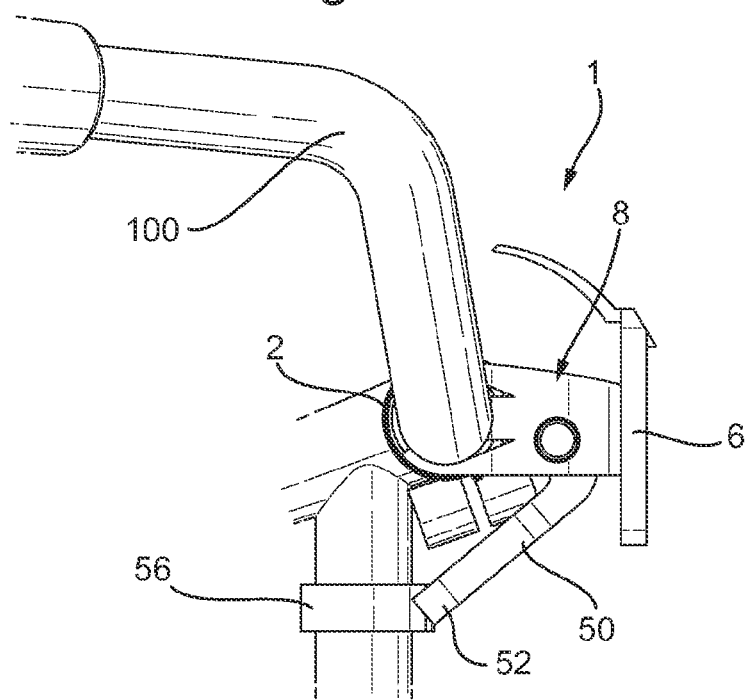
Figure 19:
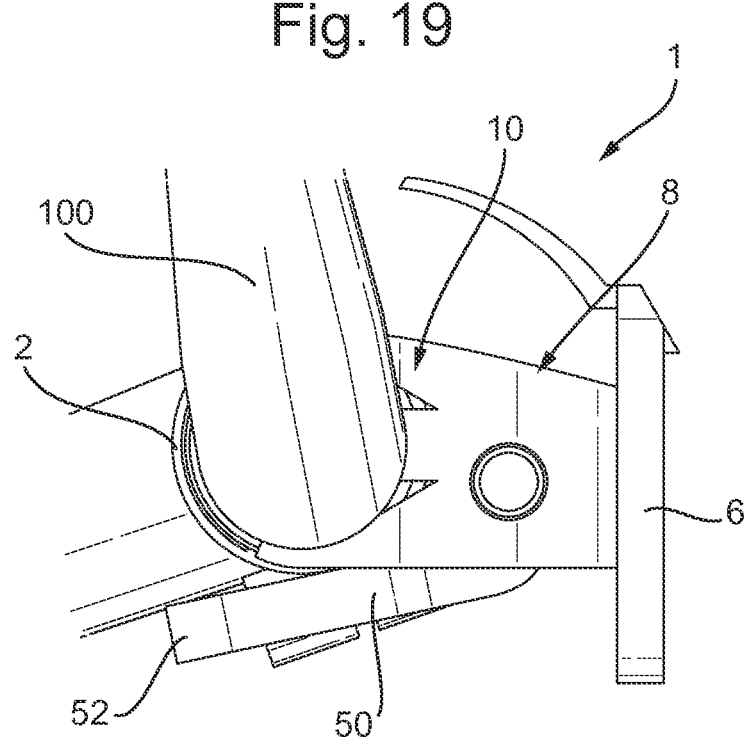

As shown in FIGS. 17 to 19, adaptation to different bicycle geometries or stem geometries can be achieved by means of the pivotable arrangement of the securing means 50 and by means of the at least partially flexible or elastic configuration of the receiving section 10 and/or the handlebar bands 2.

Basically, it is possible in the present context to form the securing means not only so that it is pivotable, but also adaptable in its dimensions. Respective telescoping systems, adapter systems or similar means are suitable for adapting the securing means to various bicycle geometries. It is also possible to provide the securing means with exchangeable elements to adapt the securing means to various bicycle geometries.

Figure 14:
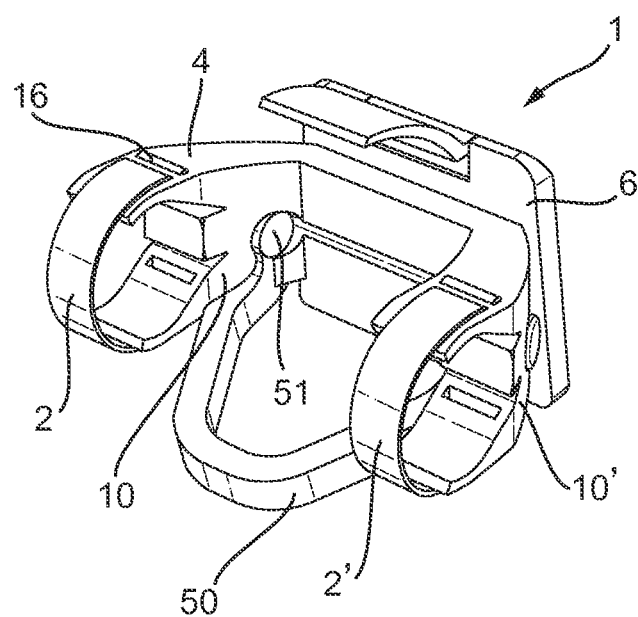
Figure 15:
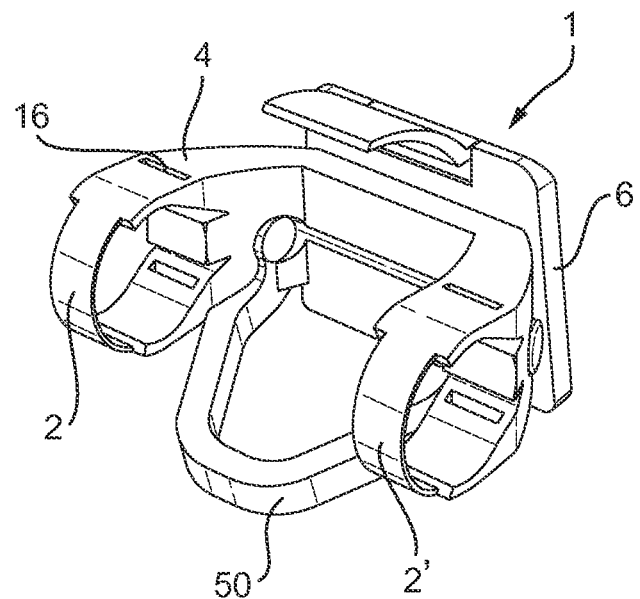
Figure 16:
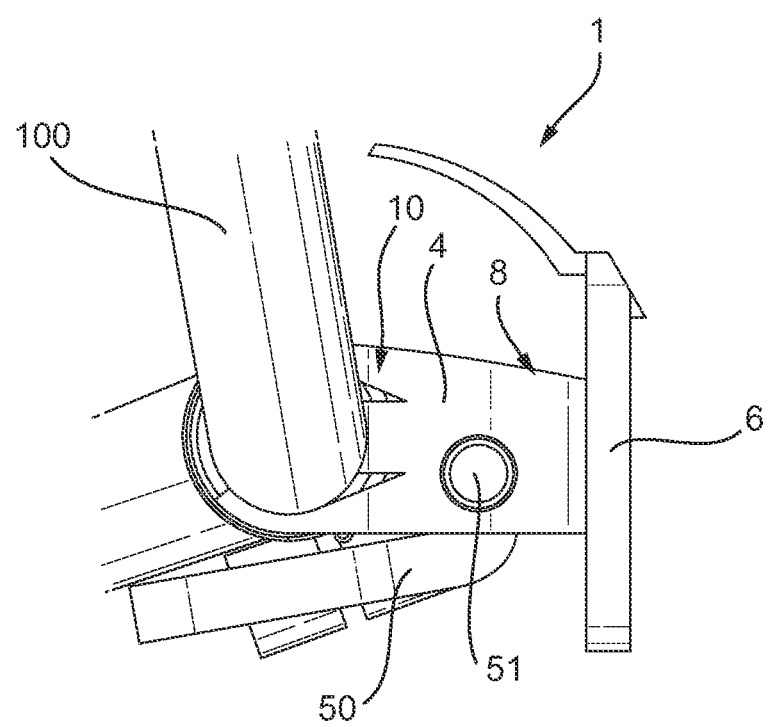

As shown in FIGS. 14 and 15, the handlebar bands 2 are optionally fixed by means of corresponding detent, hook, clamping, squeezing, threaded, hook and loop or similar attachment mechanisms on the receiving section 10 of the carrying bracket 4. To ensure reliable securing, respective fixing means 16 are used, which allow attachment of the fixing system on the handlebar 100.

Figure 20:
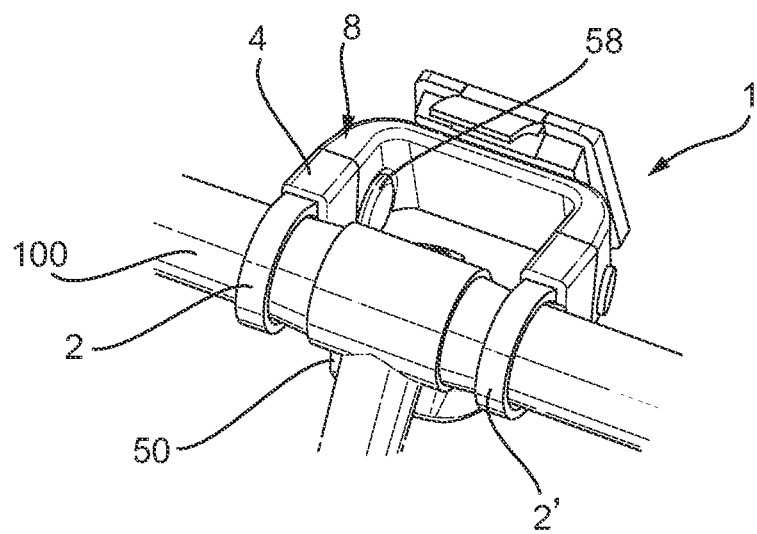
FIGS. 20 to 22 show different views of a further embodiment of the fixing system according to the present invention.
Figure 21:
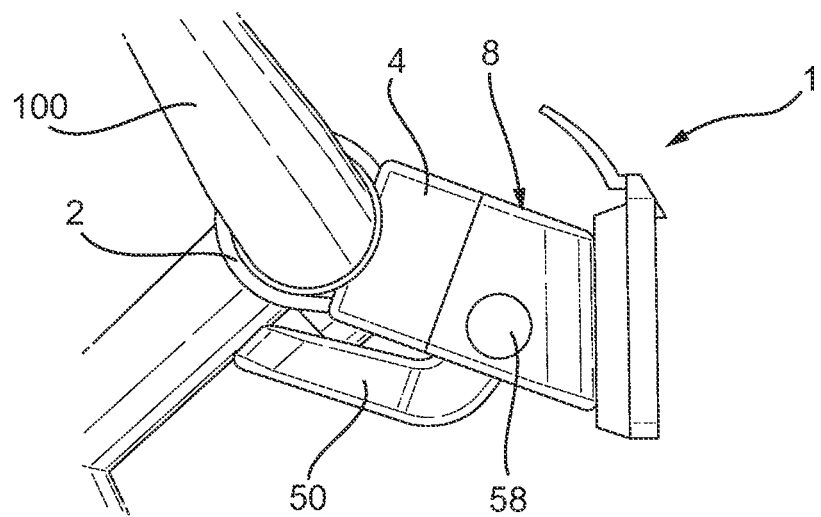
Figure 22:
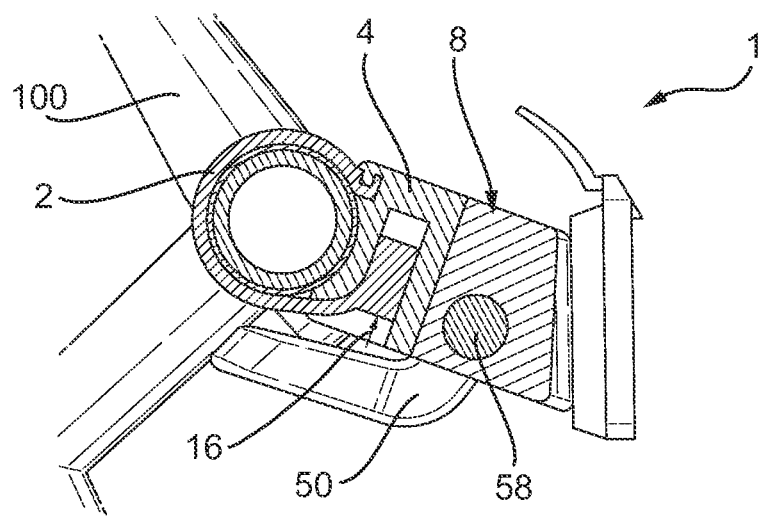

FIGS. 20 to 22 show a further embodiment of the fixing system according to the present invention which is very similar to the above-described fixing system. Differences can be found primarily in the fixing of the handlebar bands 2, which can be fixed and in particular prestressed on the carrying bracket 4 by means of threaded or detent attachment means 16 in such a manner, that secure positioning of the fixing system 1 is ensured on the handlebar 100.

Again, a securing means 50 is provided in the shape of a rigid bracket element pivotably arranged on the carrying bracket 4 or on a cantilever section 8 provided thereon. Optionally, the present securing means 50 comprises a locking means 58, so that pivotable locking relative to the carrying bracket 4 is possible. In this way, the securing means 50 can be positioned and fixed in various different positions relative to the carrying bracket 4. This allows adaptation of the fixing system to various stem geometries. As can be seen in FIGS. 21 and 22, frictional coupling is thus possible between the carrying bracket 4 or the cantilever section 8 and the stem 102, wherein rotation can be prevented in at least one rotation direction (in the present case, in a clockwise direction). By using an optionally arrangeable sling means or similar attachment means, as described above with reference to other embodiments, further fixing is also possible in the present fixing system, among others against rotation in the opposite direction.

Figure 23:
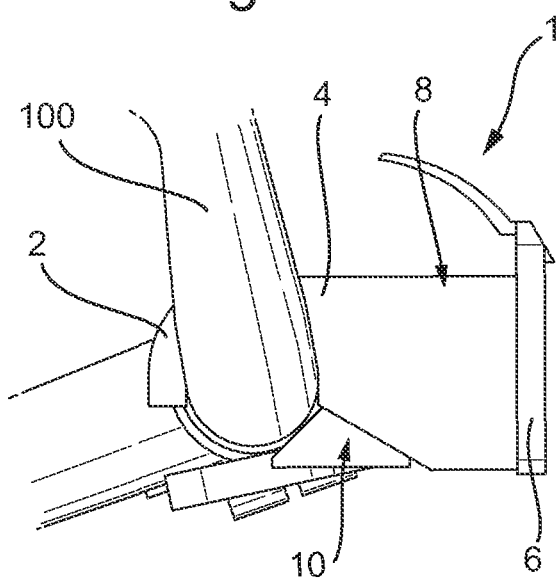
FIGS. 23 to 25 show different views of a further embodiment of the fixing system according to the present invention.
Figure 24:
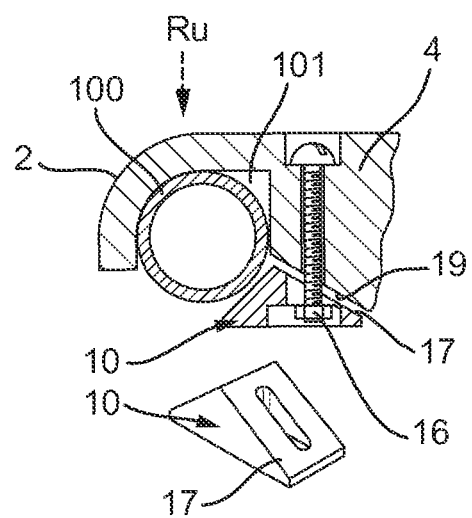
Figure 25:
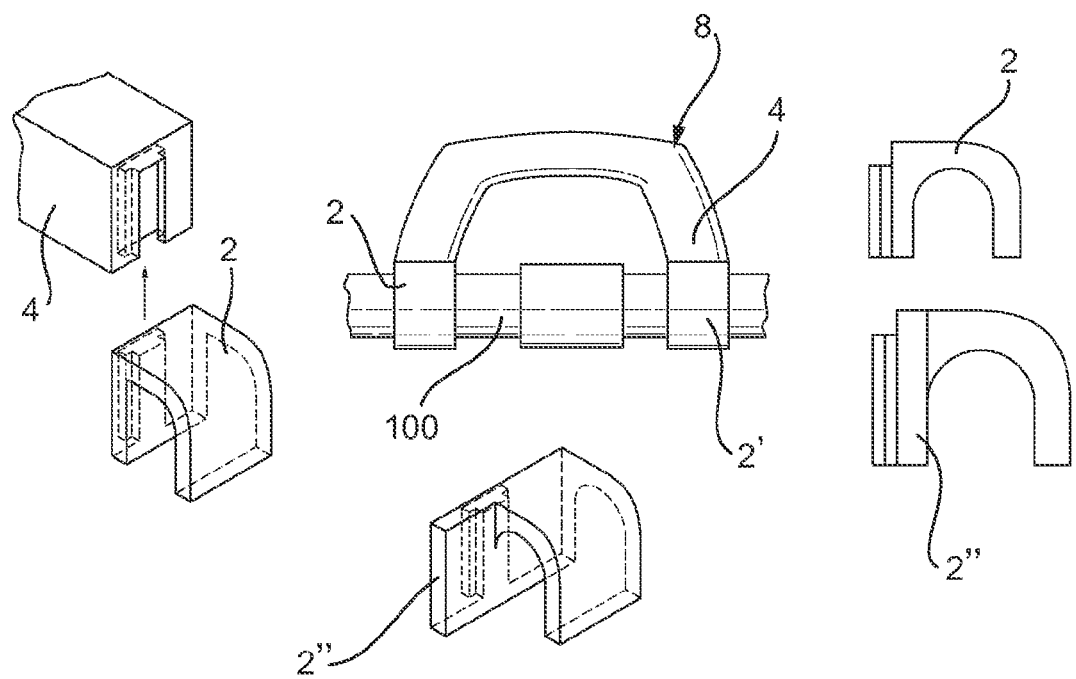
Figure 26:
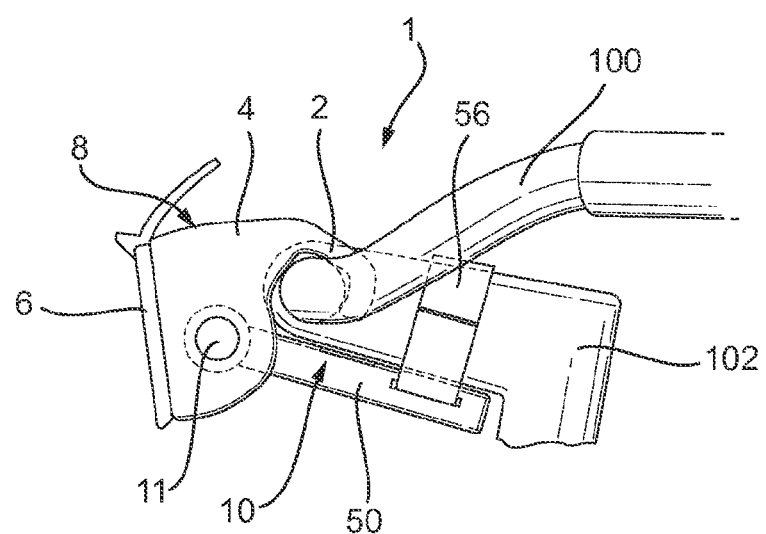
FIGS. 26 to 28 show different views of a further embodiment of the fixing system according to the present invention.
Figure 27:
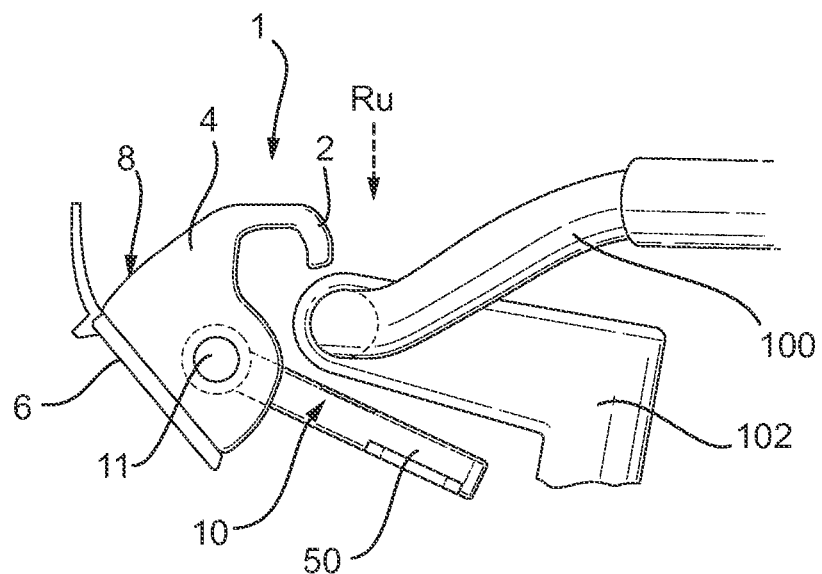

FIGS. 23 to 25 show a further embodiment of the fixing system 1 according to the present invention. While the handlebar bands 2 were mostly formed to be releasable from the carrying bracket 4 and the receiving section 10 in the previous embodiments, the system shown here is characterized by the handlebar bands 2 preferably being fixedly or integrally connected to the carrying bracket 4. The carrying bracket 4 again comprises a cantilever section 8, on which a coupling element 6 is provided, which serves to accommodate a piece of luggage, as described above. Fixing of this combination of the handlebar band 2 and the carrying bracket 4 is achieved via a receiving section 10, formed as an independent component 10, which is able to be frictionally coupled with the handlebar band 2 or the carrying bracket 4 by means of a fixing means 16 in such a way, that fixed clamping of the fixing system on the handlebar 100 is possible.

During assembly, the carrying bracket 4 provided with the handlebar bands 2 is set on the handlebar 100 in such a way that the handlebar bands 2 at least partially embrace the handlebar. Again, placing or sliding of the handlebar bands 2 occurs in a sliding-on direction $R_U$. Subsequently, the receiving section 10 can be attached by means of the fixing means 16, thus clamping the fixing system on the handlebar 100.

Optionally, the receiving section 10 is formed as a tapering element, having suitable tapering surfaces 17, which can be brought into a press fit with complementary counterpart surfaces 19 and thus cause prestressing of the fixing system on the handlebar 100. In the present context, it is also possible to fix the receiving section 10, or the correspondingly formed tapering element, with a rail system on the carrying bracket 4 in a preferably displaceable manner, enabling the fixing system 1 on the handlebar 100 to be fixed and removed, when fixing means 16 has been released, but ensuring however that the individual components remain combined in an assembly. Such a rail or similar sliding system allows displacement of the receiving section 10 relative to the carrying bracket 4 while at the same time enlarging and reducing a receiving space 101 for the handlebar 100.

As shown in FIG. 25, it is also possible to form the handlebar bands 2 releasable from the carrying bracket 4 and fixable thereon by means of corresponding fixing means. In this way, various handlebar bands can be fixed on the carrying bracket 4 in order to configure the system to be adaptable to various handlebars 100 or further components of a bicycle in a simple way. Suitable tongue and groove systems or similar fixing systems are applicable, for example. Such an adaptable configuration is applicable to almost all systems shown here. Moreover, it is of course also possible to form the handlebar bands to be at least partially elastic or flexible to accommodate various handlebars 100 within them.

FIGS. 26 to 34 show different views of a further embodiment of the fixing system 1 according to the present invention, wherein FIGS. 29 to 34 disclose detail approaches.

The embodiment shown of the fixing system according to the present invention, again comprises handlebar bands 2, which are integrally formed (or even exchangeably fixable) with a carrying bracket 4. The carrying bracket 4 comprises a cantilever section 8, on which a coupling element 6 is attachable, which serves for the fixing of containers, such as bags or baskets, as repeatedly described.

The handlebar bands 2 are formed in such a way that they are slidable over a handlebar 100 in a sliding-on direction $R_U$. For fixing on the handlebar 100, in the present embodiment, a receiving section 10 is provided, which is formed to be pivotable relative to the carrying bracket 4. For this purpose, a hinge 11 is formed, which allows pivoting of the receiving section 10 relative to the carrying bracket 4.

In the present embodiment, the receiving section 10 is integrally formed with an attachment means 50, wherein both are connected to the carrying bracket 4 as a rigid bracket element. Both the receiving section 10 and the securing means 50 can be pivoted relative to the carrying bracket 4 and its cantilever section 8 by means of the hinge 11.

Figure 29:
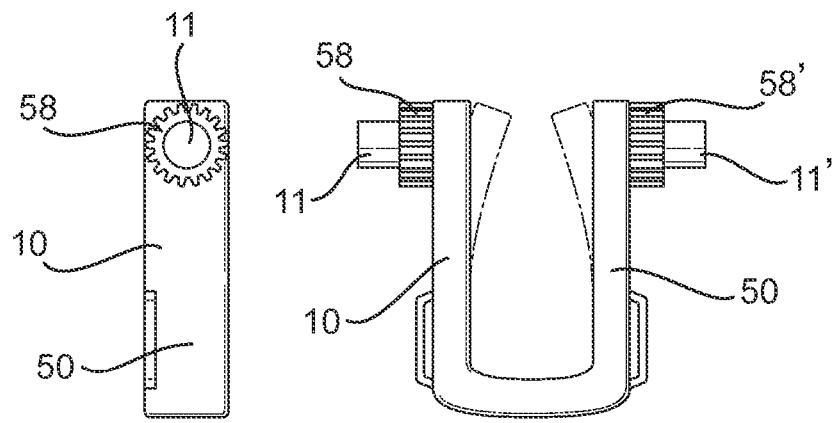
FIGS. 29 to 34 show detail views of the embodiment according to FIG. 26.
Figure 30:
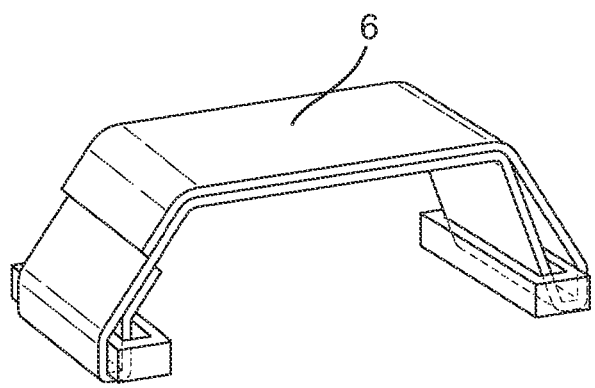
Figure 31:
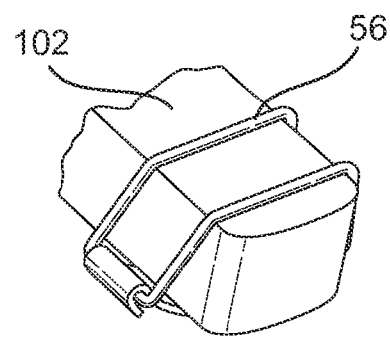
Figure 32:
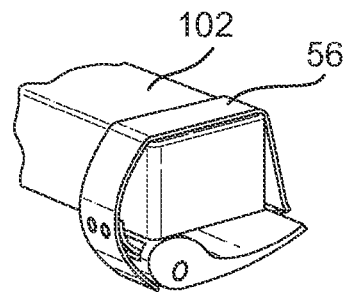
Figure 33:
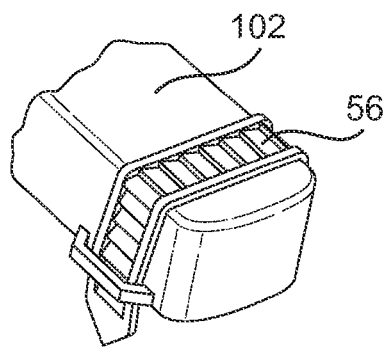
Figure 34:
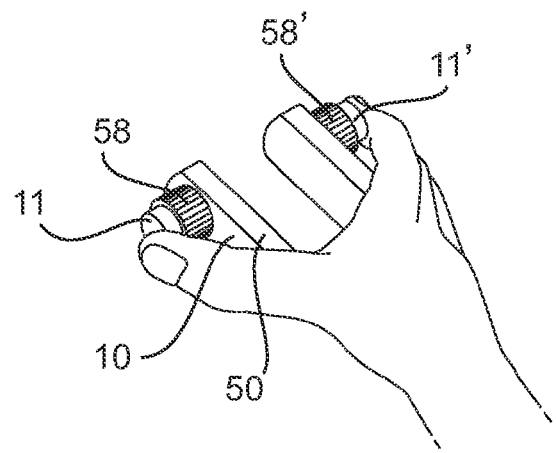

As shown in FIGS. 29 and 34, the hinge 11, in order to pivot the receiving section 10 and the securing means 50 relative to the carrying bracket 4, comprises a locking means 58 allowing locking of the securing means 50 and the receiving section 10 in different orientations relative to the carrying bracket 4. By adjusting the locking means 58, for example a detent locking means in the present case, in such a way that the handlebar 100 is clamped between the handlebar bands 2 and the receiving section 10, secure fixing of the fixing system 1 is possible on the handlebar 100. By additional fixing of the securing means 50 by means of a fixing means 56 and in the present case, for example, via a sling means, additional positional securing of the fixing system is implementable on the handlebar 100.

Figure 28:
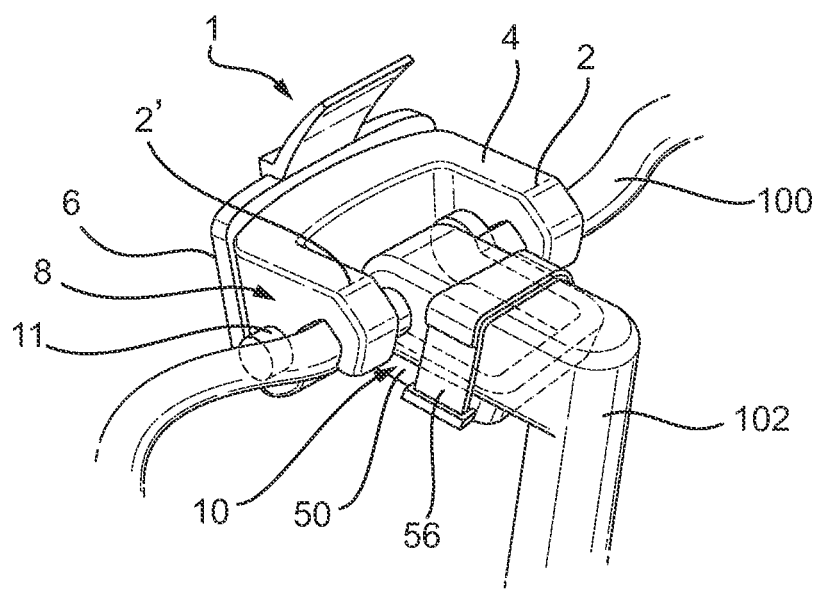

As shown in FIG. 28, the locking means 58 in the present embodiment is formed as a pressure locking means, which can be released and be brought into a pivoting state by exerting an axial pressure in the direction of the pivoting axis of the securing means or the receiving section 10. By releasing the pressure, the locking means 58 comes back into engagement in the locking state and fixes the securing means 50 or the receiving section 10 relative to the carrying bracket 4. To improve such releasable locking, optionally, the securing means 50 or the receiving section 10 are formed as a bracket element, which is elastic at least about one axis.

FIGS. 30 to 33 show different embodiments of a fixing means 56, applicable to the above-described but also to all other embodiments for fixing the securing means 50 to a component remote from the handlebar, and in particular to a handle stem 102. Hook and loop fasteners (see FIG. 30), elastic and in particular hook element fasteners (FIG. 31), toggle lever fasteners (FIG. 23), and also detent fasteners (FIG. 33) can be used, for example.

Figure 35:
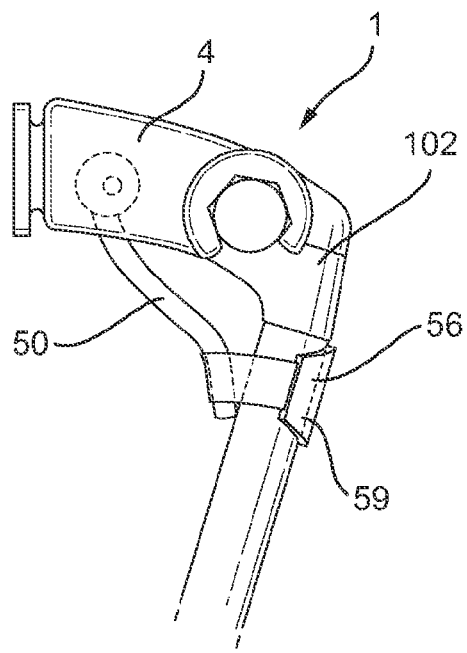
FIGS. 35 to 37 show a further embodiment of the fixing system according to the present invention.
Figure 36:
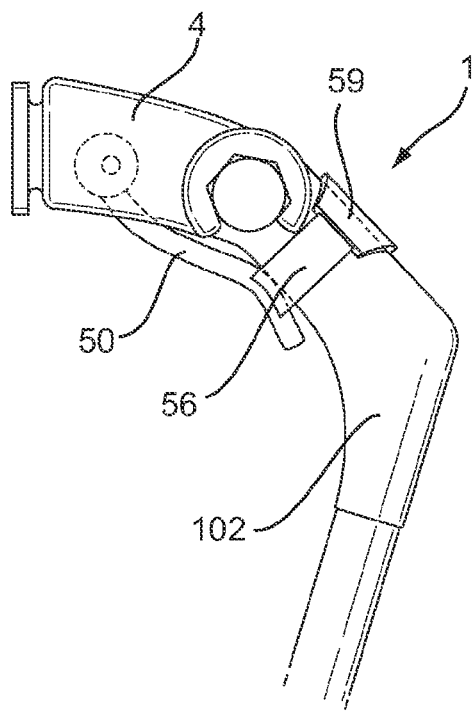
Figure 37:
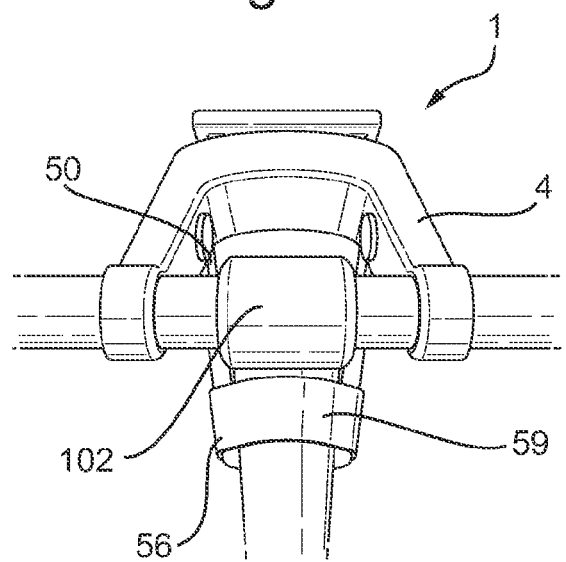

FIGS. 35 to 37 show a further embodiment of the fixing system 1 according to the present invention, which basically corresponds to the above-described embodiment. The relevant feature in this case, is that the securing means 50 used here is formed as an exchangeable securing means 50, wherein various geometries of the securing means 50 can be used for attaching the fixing system on different handle stems 102. To achieve this, the securing means 50 is releasably connected to a carrying bracket 4. Depending on the stem 102, different securing means 50 are used for fixing the carrying bracket 4.

The special embodiment of the fixing means 56 is also relevant for the present embodiment, which is also configured as a sling means. The sling means 56 comprises a support plate 59 which can serve for improved attachment of the fixing or the sling means 56 on the stem 102, but also for receiving advertising elements or corresponding information elements. The support plate 59 can be provided in various embodiments and materials.

Figure 38:
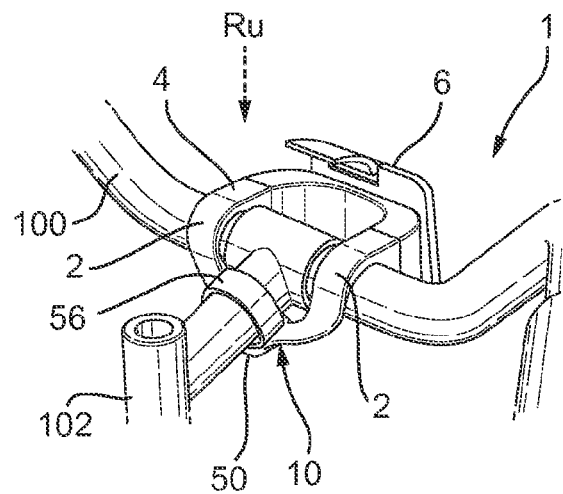
FIGS. 38 to 40 show different views of a further embodiment of a fixing system.
Figure 39:
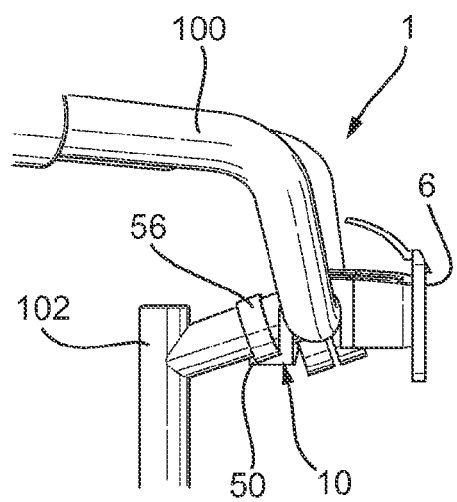
Figure 40:
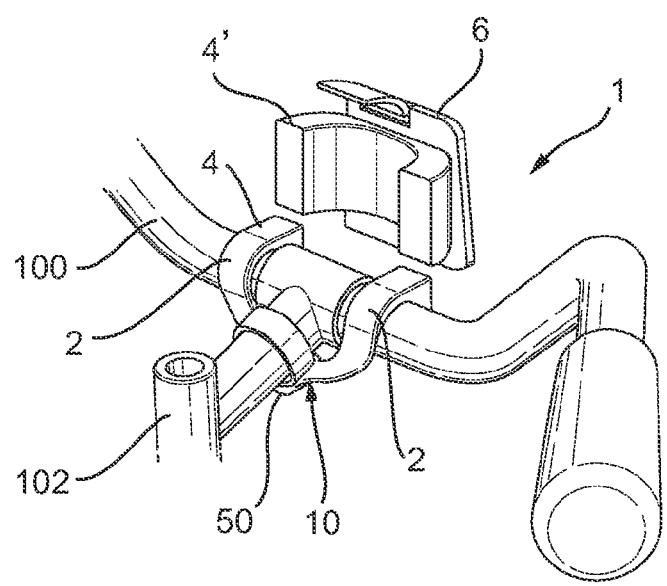

FIGS. 38 to 40 show a further embodiment of a fixing system 1. Again, handlebar bands 2 are configured in such a way that they can be slid on a handlebar 100 in a sliding-on direction $R_U$. The fixing bands 2 are connected or optionally connectable to a carrying bracket 4 (see FIG. 40) on which in turn a coupling element 6 is arranged for receiving a piece of luggage. A receiving section 10 is integrally formed with the handlebar bands, which in the present case is formed as a lever element in such a way, that by fixing it on a stem 102 it applies a coupling force to the handlebar 100 via the handlebar bands 2. The fixing system 1 according to the present invention thus consists of a bracket arrangement comprising the receiving section 10, the handlebar bands 2 and carrying bracket 4. a securing means 50 is provided as an extension of the receiving section 10 or covering the latter, thus enabling fixing of the receiving section 10 and thus also the handlebar bands 2 on the stem 102. A fixing means 56 in the form of a sling element is provided again for fixing, as already described above.

As shown in FIG. 40, the carrying bracket has a multi-part configuration and/or is formed in such a way that it allows releasable arrangement of the coupling element 6. The coupling element 6 can be fixed on the carrying bracket by means of suitable fixing and locking means 58.

LIST OF REFERENCE NUMERALS 2 handlebar band
4 carrying bracket
6 coupling element
8 cantilever section
10 receiving section
11 hinge
12 end section
14 introduction space
16 fixing means
17 tapering surface
19 tapering counter surface
22 mounting protrusion
24 arm
26 end section of arm
30 fixing means
32 mounting protrusion receiver
34 detent means
36 support body
38 end face
40 support surface
42 mounting protrusion receiver
44 receiving means
46 counter detent means
48 adapter element
50 securing means
51 first end
52 second end
53 connection area
54 contacting surface
56 fixing means
58 locking means
59 support plate
60 cover
62 receiver
100 handlebar
101 receiving space
102 handle stem
$R_U$ sliding-on direction

The invention claimed is:

1. A fixing system for fixing containers such as bags or baskets on a handlebar of a bicycle, comprising:
    at least one handlebar band slidable over the handlebar in a sliding-on direction to at least partially embrace the handlebar in the slid-on position;
    a carrying bracket, comprising a carrying-bracket-side coupling element configured for receiving the container, which is arranged on a cantilever section of the carrying bracket, the carrying bracket further comprising a receiving section configured to be brought into coupling engagement with the at least one handlebar band against the sliding-on direction and be positioned on the handlebar by fixedly clamping the handlebar; and
    at least one securing means configured to be frictionally engageable in a rigid manner between the cantilever section and a handle stem of the bicycle so that rotation of the cantilever section relative to the handlebar is prevented.

2. The fixing system according to claim 1, wherein the securing means is formed as a torsion bar and/or compression bar element, and as an essentially rigid bracket element.

3. The fixing system according to claim 1, wherein the securing means is configured to be frictionally coupleable against the handle stem such that rotation of the cantilever section relative to the handlebar is prevented at least in two opposite rotation directions.

4. The fixing system according to claim 1, wherein the securing means includes at least one locking means via which it is arranged on the carrying bracket in a fixable rotatable manner.

5. The fixing system according to claim 1, wherein the securing means is arrangeable and/or fixable at least partially at different positions on the carrying bracket.

6. The fixing system according to claim 1, wherein the securing means is fixable via at least one fixing means on the handle stem.

7. The fixing system according to claim 1, wherein the handlebar bands are formed as independent components.

8. The fixing system according to claim 1, wherein the handlebar bands have mounting protrusions at least at free end sections and the receiving section of the carrying bracket has complementary mounting protrusion receivers into which the mounting protrusions are configured to be introduced parallel to the sliding-on direction.

9. The fixing system according to claim 8, wherein the carrying bracket is formed as a U-shaped bracket having at least two arms, and wherein the arms at least partially form the cantilever section, and wherein the mounting protrusion receivers are formed and/or arrangeable in or on the arms.

10. The fixing system according to claim 9, wherein the mounting protrusion receivers are provided as optionally arrangeable mounting protrusion receivers fixable on the carrying bracket by means of receiving means at least at one alternative position and configured to be brought into coupling engagement with the bands.

11. The fixing system according to claim 10, wherein the coupling element is arranged on end sections of the arms and spaced from the mounting protrusion receivers.

12. The fixing system according to claim 11, wherein the coupling element comprises a support body formed to be fixable between the two arms of the carrying bracket in a clampable manner and allows fixing of the coupling element in different positions and/or in different orientations.

13. The fixing system according to claim 12, wherein the support body comprises at least two end faces facing away from each other, which are formed to be complementary and parallel to corresponding support surfaces on the arms of the carrying bracket, and at least one fixing means, by means of which the end faces are configured to be pressed against the support surfaces thus fixing the support body.

14. The fixing system according to claim 13, wherein the coupling element and the end faces comprise a locking means configured to be brought into releasable frictional engagement with a counter locking means on the arms of the carrying bracket and on the support surfaces, allowing fixing of the coupling element in different positions and/or in different orientations.

15. The fixing system according to claim 1, wherein the receiving section and the mounting protrusion receivers are arranged along the carrying bracket between the securing means and the cantilever sections.

16. The fixing system according to claim 1, wherein the securing means is arranged in a connection area of the free arms.

17. The fixing system according to claim 1, wherein the carrying bracket is formed to be pressable against the underside of the handlebar in such a manner that at least a portion thereof abuts against the underside of the handle stem of the bicycle.

18. The fixing system according to claim 1, wherein the at least one handlebar band comprises two handlebar bands.

* * * * *